(12) United States Patent
Seno et al.

(10) Patent No.: US 11,015,029 B2
(45) Date of Patent: May 25, 2021

(54) ETHYLENE-VINYL ALCOHOL COPOLYMER COMPOSITION PELLETS, AND PRODUCTION METHOD FOR ETHYLENE-VINYL ALCOHOL COPOLYMER COMPOSITION PELLETS

(71) Applicant: MITSUBISHI CHEMICAL CORPORATION, Tokyo (JP)

(72) Inventors: Ryuta Seno, Osaka (JP); Makoto Hatanaka, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/451,581

(22) Filed: Jun. 25, 2019

(65) Prior Publication Data

US 2019/0322817 A1 Oct. 24, 2019

Related U.S. Application Data

(63) Continuation of application No. PCT/JP2017/047094, filed on Dec. 27, 2017.

(30) Foreign Application Priority Data

| Dec. 28, 2016 | (JP) | JP2016-257021 |
| Dec. 28, 2016 | (JP) | JP2016-257022 |
| Dec. 28, 2016 | (JP) | JP2016-257024 |

(51) Int. Cl.
| *C08J 3/205* | (2006.01) |
| *C08F 216/06* | (2006.01) |
| *C08K 3/38* | (2006.01) |
| *C08K 5/09* | (2006.01) |
| *C08K 5/098* | (2006.01) |
| *C08K 5/20* | (2006.01) |
| *C08K 13/02* | (2006.01) |

(52) U.S. Cl.
CPC .......... *C08J 3/2053* (2013.01); *C08F 216/06* (2013.01); *C08K 3/38* (2013.01); *C08K 5/09* (2013.01); *C08K 5/098* (2013.01); *C08K 5/20* (2013.01); *C08K 13/02* (2013.01); *C08F 2800/10* (2013.01); *C08K 2201/014* (2013.01)

(58) Field of Classification Search
CPC ... C08J 3/2053; C08F 216/06; C08F 2800/10; C08K 5/09; C08K 5/098; C08K 2201/014; C08K 5/20; C08K 13/02; C08K 3/38
USPC ........................................................ 524/228
See application file for complete search history.

(56) References Cited

U.S. PATENT DOCUMENTS

| 5,744,547 | A | 4/1998 | Moritani et al. |
| 9,453,094 | B2 | 2/2016 | Nakazawa et al. |
| 2004/0204549 | A1* | 10/2004 | Yoshimi .................. B29C 48/00 525/330.6 |
| 2007/0275197 | A1 | 11/2007 | Chow et al. |
| 2015/0159005 | A1* | 6/2015 | Nakazawa .............. B32B 27/08 426/412 |

FOREIGN PATENT DOCUMENTS

| EP | 2730614 | 5/2014 |
| EP | 3375818 | 9/2018 |
| JP | H9-71620 | 3/1997 |
| JP | 2001-206999 | 7/2001 |
| JP | 2003-89706 | 3/2003 |

OTHER PUBLICATIONS

International Search Report issued in Patent Application No. PCT/JP2017/047094 dated Apr. 3, 2018 with English translation.
English Translation of International Preliminary Report on Patentability issued in Patent Application No. PCT/JP2017/047094 dated Jul. 11, 2019.
Supplemental European Search Report issued for the European Patent Application No. 17887929.2 dated Nov. 13, 2019.

* cited by examiner

*Primary Examiner* — Hui H Chin
(74) *Attorney, Agent, or Firm* — Greenblum & Bernstein, P.L.C.

(57) ABSTRACT

Ethylene-vinyl alcohol copolymer composition pellets comprise: an ethylene-vinyl alcohol copolymer, a conjugated polyene, and a predetermined amount of at least one fisheye-suppressing component; wherein pellet surface portions of the ethylene-vinyl alcohol copolymer composition pellets have a conjugated polyene content of not lower than 30 ppb based on the weight of the pellets. Such ethylene-vinyl alcohol copolymer composition pellets are capable of reliably suppressing occurrence of minute fisheyes having a diameter of 200 μm or smaller.

8 Claims, No Drawings

ETHYLENE-VINYL ALCOHOL COPOLYMER COMPOSITION PELLETS, AND PRODUCTION METHOD FOR ETHYLENE-VINYL ALCOHOL COPOLYMER COMPOSITION PELLETS

RELATED APPLICATION

This application is a continuation of International Application No. PCT/JP2017/047094, filed on Dec. 27, 2017, which claims priority to Japanese Patent Application Nos. 2016-257021, 2016-257022, and 2016-257024 filed on Dec. 28, 2016, the entire contents of each of which is hereby incorporated by reference.

TECHNICAL FIELD

The present disclosure relates to ethylene-vinyl alcohol copolymer (hereinafter sometimes referred to simply as "EVOH") composition pellets which can provide a film having very few fisheyes when being used for film formation. More specifically, the present disclosure relates to EVOH composition pellets which have a controlled conjugated polyene content in their surfaces and contain a predetermined amount of a specific component, and to a production method for the EVOH composition pellets.

BACKGROUND ART

The EVOH has crystalline portions formed due to firm hydrogen bonds between hydroxyl groups present in its molecular chains, and these crystalline portions prevent intrusion of gas such as oxygen from the outside. Therefore, the EVOH is excellent in gas barrier properties, e.g., oxygen barrier property. Taking advantage of the excellent gas barrier properties, the EVOH is formed into films, sheets, bottles, and other containers for use as food packaging materials, pharmaceutical product packaging materials, industrial chemical packaging materials, agricultural chemical packaging materials, and the like.

The EVOH is typically melt-formed and/or processed into film form, sheet form, bottle form, cup form, tube form, pipe form, and the like for practical applications. Therefore, the formability and the processability of the EVOH are important factors.

The EVOH contains relatively active hydroxyl groups in its molecule. Therefore, the EVOH is liable to experience oxidation reaction and crosslinking reaction even in a generally oxygen-free environment in an extruder to thereby produce a thermal degradation product when being heat-melted at a higher temperature. It is known that the thermal degradation product is disadvantageously liable to cause gel-like blobs which may cause fisheyes.

For elimination of such a disadvantage, PTL 1 proposes an EVOH composition which contains an EVOH and a conjugated polyene for suppression of the fisheyes, the gel-like blobs, and the like which may occur in the melt forming.

PTL 1 discloses a method in which a conjugated polyene having a boiling point of not lower than 20° C. is added to a copolymer prepared by copolymerizing monomers including vinyl acetate in a vinyl acetate copolymer preparation process, and then the resulting vinyl acetate copolymer is saponified. A composition containing an EVOH and 0.00002 to 1 wt. % (0.2 to 10,000 ppm), preferably 0.0001 to 0.2 wt. % (1 to 2,000 ppm), of the conjugated polyene having a boiling point of not lower than 20° C. is proposed as an EVOH composition prepared by this method (paragraph [0034] of PTL 1).

PTL 1 states that, if the polyene compound remains in the final saponification product, a packaging container or the like formed from the EVOH composition is liable to suffer from emanation of odor and bleeding and, therefore, an excess amount of the remaining polyene compound is not preferred, and that a polyene compound which can be rinsed away with water after the saponification is preferably used (paragraph [0011] of PTL 1).

More specifically, EVOH is prepared by polymerizing ethylene and vinyl acetate under ethylene pressure, adding the conjugated polyene to the resulting copolymer, removing remaining ethylene from the copolymer, and saponifying the resulting copolymer, and then rinsed with a great amount of water, whereby intended EVOH particles are produced (Example 1 of PTL 1).

PTL 1 states that a film formed by using the EVOH particles thus produced is less liable to suffer from coloration, and the number of gel-like blobs each having a size of not less than 100 µm is 3 to 10 per 100 cm$^2$ of the film (see Table 1 of PTL 1).

PTL 2 discloses a method for producing a vinyl alcohol polymer capable of suppressing fisheyes, coloration, and odor emanation in a forming process. In the vinyl alcohol polymer production method, the vinyl alcohol polymer is produced by polymerizing a vinyl acetate compound, removing unreacted vinyl acetate in a distillation column, and adding at least one of N,N-dialkylhydroxylamine, styrene derivative, hydroquinone derivative, quinone derivative, piperidine derivative, and conjugated polyene as a polymerization inhibitor to the resulting polymer.

RELATED ART DOCUMENT

Patent Document

PTL 1: JP-A-HEI9 (1997)-71620
PTL 2: JP-A-2003-89706

SUMMARY

With recent increasingly stricter requirements for the appearance and the odor of the packaging material, it is desirable to more reliably suppress the occurrence of the fisheyes while ensuring the melt formability. Particularly, there is a demand for EVOH pellets capable of sufficiently suppressing the occurrence of minute fisheyes each having a diameter of not greater than 200 µm.

In view of the foregoing, it is an object of the present disclosure to provide EVOH composition pellets capable of highly reliably suppressing the occurrence of minute fisheyes each having a diameter of not greater than 200 µm, and to provide a method for producing the same.

In view of the foregoing, the inventors conducted intensive studies and, as a result, found that, where the EVOH composition pellets have a conjugated polyene content not less than a predetermined level in surface portions thereof and contains a predetermined amount of at least one component selected from the group consisting of a lubricant, a boron compound, and an alkali metal (hereinafter sometimes referred to collectively as "fisheye-suppressing component"), the EVOH composition pellets are capable of highly reliably suppressing the occurrence of the fisheyes when being melt-formed.

According to a first aspect of the present disclosure, EVOH composition pellets are provided which contain an EVOH, a conjugated polyene, and at least one component (fisheye-suppressing component) selected from the group consisting of:

(A) 10 to 400 ppm of a lubricant based on the weight of the EVOH composition pellets;
(B) 10 to 250 ppm of a boron compound based on the weight of the EVOH composition pellets; and
(C) 1 to 500 ppm of an alkali metal based on the weight of the EVOH composition pellets, wherein pellet surface portions of the EVOH composition pellets have a conjugated polyene content of not lower than 30 ppb based on the weight of the pellets.

According to a second aspect of the present disclosure, a method for producing EVOH composition pellets of the first aspect is provided, which includes bringing pellets of an EVOH into contact with a treatment liquid containing a conjugated polyene; and bringing the EVOH pellets into contact with a fisheye-suppressing component.

The EVOH composition pellets of the present disclosure contain the EVOH, the conjugated polyene, and the specific fisheye-suppressing component. The conjugated polyene content of the pellet surface portions of the pellets is not lower than 30 ppb based on the weight of the pellets, and the pellets contain the predetermined amount of the specific fisheye-suppressing component. Therefore, the EVOH composition pellets of the present disclosure are excellent in fisheye-suppressing effect while ensuring the melt formability.

Particularly, where the EVOH composition pellets have an overall conjugated polyene content of 0.1 to 10,000 ppm based on the weight of the pellets, the EVOH composition pellets are better in fisheye-suppressing effect.

Particularly, where the weight-based content ratio (surface conjugated polyene content/overall conjugated polyene content) between the conjugated polyene content of the pellet surface portions of the EVOH composition pellets and the overall conjugated polyene content of the EVOH composition pellets is not lower than $1.5 \times 10^{-5}$, the EVOH composition pellets are still better in fisheye-suppressing effect.

Particularly, where the conjugated polyene is at least one selected from the group consisting of sorbic acid, a sorbic acid ester, and a sorbic acid salt, the amount of the conjugated polyene adhering to the surfaces of the EVOH pellets can be more easily controlled, and the EVOH composition pellets are excellent in fisheye-suppressing effect.

In the EVOH composition pellet production method including bringing the EVOH pellets into contact with the treatment liquid containing the conjugated polyene, and bringing the EVOH pellets into contact with the fisheye-suppressing component, the EVOH composition pellets can be produced as containing a predetermined amount of the conjugated polyene and a predetermined amount of the fisheye-suppressing component with the use of a conventional production facility.

Where the EVOH pellets are prepared by solidifying and pelletizing an alcohol solution or a water/alcohol mixed solution of the EVOH in the production method of the present disclosure, the EVOH pellets are porous and, therefore, the resulting EVOH composition pellets are better in fisheye-suppressing effect.

Where the EVOH pellets are porous EVOH pellets in the production method of the present disclosure, the conjugated polyene can be effectively incorporated to the pellet surface portions of the EVOH pellets and, therefore, the resulting EVOH composition pellets are better in fisheye-suppressing effect.

Where the production method of the present disclosure further includes the step of adding the conjugated polyene as a polymerization inhibitor to an ethylene-vinyl ester copolymer and then saponifying the ethylene-vinyl ester copolymer to prepare the EVOH, the resulting EVOH composition pellets are still better in fisheye-suppressing effect.

DESCRIPTION OF EMBODIMENTS

Preferred embodiments of the present disclosure will hereinafter be described in detail. It should be understood that these preferred embodiments are illustrative but not limitative.

The EVOH composition pellets of the present disclosure have a conjugated polyene content of not lower than 30 ppb based on the weight of the pellets in pellet surface portions thereof, and contain a predetermined amount of a fisheye-suppressing component.

Prior to description of the EVOH composition pellets of the present disclosure, formulation ingredients of the EVOH composition pellets, and an EVOH pellet production method will be described.

<EVOH>

The EVOH for the EVOH composition pellets of the present disclosure is typically a resin prepared by saponifying a copolymer of ethylene and a vinyl ester monomer (ethylene-vinyl ester copolymer), or a water-insoluble thermoplastic resin generally referred to as an ethylene-vinyl alcohol copolymer or a saponified ethylene-vinyl ester copolymer.

Vinyl acetate is typically used as the vinyl ester monomer because it is easily commercially available and ensures a higher impurity treatment efficiency in the preparation. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters typically have a carbon number of 3 to 20, preferably 4 to 10, particularly preferably 4 to 7. These vinyl ester monomers may be typically each used alone but, as required, may be used in combination.

Ethylene and the vinyl ester monomer described above are typically prepared by using a material derived from petroleum such as naphtha. Monomers prepared from materials derived from natural gas such as shale gas, and plant-derived materials such as obtained by refining sugar and starch contained in sugar cane, sugar beet, corn, potato, and the like, and cellulose contained in rice, wheat, millet, grass, and the like are also usable.

The EVOH to be used in the present disclosure may be prepared by copolymerization of the aforementioned monomers with any of the following comonomers (hereinafter referred to as "other comonomer") to be added in an amount (e.g., not greater than 10 mol %) that does not impair the effects of the present disclosure.

The other comonomers include: olefins such as propylene, 1-butene, and isobutene; hydroxyl-containing α-olefins such as 3-buten-1-ol, 3-butene-1,2-diol, 4-penten-1-ol, and 5-hexene-1,2-diol, and esterification products, acylation products, and other derivatives of these hydroxyl-containing α-olefins; unsaturated acids such as acrylic acid, methacrylic acid, crotonic acid, phthalic acid (anhydride), maleic acid (anhydride), and itaconic acid (anhydride), salts of these unsaturated acids, and monoalkyl and dialkyl esters of these unsaturated acids having a carbon number of 1 to 18; acrylamide compounds such as acrylamide, N-alkyl acrylamides having a carbon number of 1 to 18, N,N-dimethyl acrylamide, 2-acrylamidopropane sulfonic acid and its salts, and acrylamidopropyldimethylamine and its acid salts and quaternary salts; methacrylamide compounds such as methacrylamide, N-alkyl methacrylamides having a carbon number of 1 to 18, N,N-dimethyl methacrylamide, 2-methacrylamidopropane sulfonic acid and its salts, and methacrylamidopropyldimethylamine and its acid salts and quaternary salts; N-vinylamides such as N-vinylpyrrolidone, N-vinylformamide, and N-vinylacetamide; vinyl cyanates such as acrylonitrile and methacrylonitrile; vinyl ethers such as alkyl vinyl ethers, hydroxyalkyl vinyl ethers, and alkoxyalkyl vinyl ethers having a carbon number of 1 to 18; halogenated vinyl compounds such as vinyl chloride, vinylidene chloride, vinyl fluoride, vinylidene fluoride, and vinyl bromide; vinylsilanes such as trimethoxyvinylsilane; allyl acetate; halogenated allyl compounds such as allyl chloride; allyl alcohol compounds such as allyl alcohol and dimethoxyallyl alcohol; and trimethyl(3-acrylamido-3-dimethylpropyl)ammonium chloride and acrylamido-2-methylpropane sulfonic acid. These may be used alone or in combination.

A known polymerization method such as solution polymerization method, suspension polymerization method, emulsion polymerization method or bulk polymerization method may be utilized for the copolymerization of ethylene, the vinyl ester monomer, and the optional other comonomer. The solution polymerization method is preferably used from the viewpoint of homogenous dispersion. The polymerization may be carried out on a continuous basis or on a batch basis.

In the solution polymerization method, a solution containing the vinyl ester monomer, a solvent, and a polymerization catalyst is fed into a polymerization can, and the polymerization is allowed to proceed by feeding ethylene into the polymerization can with pressure while heating and stirring the solution. The pressure of ethylene is typically about 20 to about 80 kg/cm$^2$.

An alcohol is preferred as the solvent. Other examples of the solvent include organic solvents (dimethyl sulfoxide and the like) in which ethylene, vinyl acetate, and the ethylene-vinyl acetate copolymer are soluble. Examples of the alcohol include C1 to C10 aliphatic alcohols such as methanol, ethanol, propanol, n-butanol, and t-butanol. These solvents may be used alone or in combination. Among these, methanol is particularly preferred.

The catalyst to be used for the solution polymerization method is not particularly limited, as long as it is a radical initiator. Initiators such as azonitrile initiators and organic peroxide initiators are usable as the catalyst, and preferred examples of the initiators include: azo compounds such as 2,2'-azobis-(2,4-dimethylvaleronitrile), 2,2'-azobis-(2,4,4-trimethylvaleronitrile), 2,2'-azobisisobutyronitrile, 2,2'-azobis-(4-methoxy-2,4-dimethylvaleronitrile), and 2,2'-azobis-(2-methyl isobutyrate); alkyl peresters such as t-butyl peroxyneodecanoate, t-butyl perpivalate, and t-butylperoxy-2-ethyl hexanoate; peroxydicarbonates such as bis-(4-t-butylcyclohexyl) peroxydicarbonate, dicyclohexyl peroxydicarbonate, bis-(2-ethylhexyl) peroxydicarbonate, di-sec-butyl peroxydicarbonate, and diisopropyl peroxydicarbonate; and peroxides such as acetyl peroxide, benzoyl peroxide, lauroyl peroxide, dilauroyl peroxide, didecanoyl peroxide, dioctanoyl peroxide, and dipropyl peroxide. These may be used alone or in combination. Where a catalyst having a short half-life is used in the batch-based polymerization method, the catalyst cannot be fed on a batch basis, but should be continuously fed to the polymerization can.

The polymerization temperature is typically 20° C. to 90° C., preferably 40° C. to 70° C. The polymerization period is typically 2 to 15 hours, preferably 3 to 11 hours. In the continuous polymerization method, the polymerization period is preferably substantially the same as an average retention time during which the solution is retained in the polymerization can.

In the solution polymerization method, the polymerization is terminated when a predetermined polymerization degree is reached. The polymerization degree is typically 10 to 90 mol %, preferably 30 to 80 mol %, based on the molar amount of the fed vinyl ester monomer. Further, a solution obtained after the polymerization typically has a resin content of 5 to 85 wt. %, preferably 20 to 70 wt. %.

For the termination of the polymerization, a polymerization inhibitor is generally added. Examples of the polymerization inhibitor include N,N-dialkylhydroxylamine, styrene derivative, hydroquinone derivative, quinone derivative, piperidine derivative, and conjugated polyene, which may be used alone or in combination. Among these, the conjugated polyene is preferably used. The conjugated polyene may finally remain in the EVOH composition pellets of the present disclosure to serve for the suppression of the occurrence of the fisheyes.

Compounds shown below as the conjugated polyene may be used as the polymerization inhibitor.

For the homogenous dispersion, the conjugated polyene to be used as the polymerization inhibitor is preferably added in the form of a conjugated polyene solution prepared by dissolving the conjugated polyene in the same solvent as used for the polymerization.

Where the conjugated polyene is used as the polymerization inhibitor, the amount of the conjugated polyene to be added is typically 0.0001 to 3 parts by weight, preferably 0.0005 to 1 part by weight, more preferably 0.001 to 0.5 parts by weight, based on 100 parts by weight of the fed vinyl ester monomer.

After the completion of the polymerization, unreacted ethylene gas and unreacted vinyl ester monomer are removed from the resulting ethylene-vinyl ester copolymer solution, which is in turn subjected to saponification.

The unreacted ethylene gas can be removed, for example, by evaporation. An exemplary method to be used for removing the unreacted vinyl ester monomer from the ethylene-vinyl ester copolymer solution includes the steps of: continuously feeding the ethylene-vinyl ester copolymer solution at a constant rate from an upper portion of a column filled with Raschig rings; introducing vapor of an organic solvent such as methanol from a lower portion of the column to allow a mixed vapor including the organic solvent (methanol) and the unreacted vinyl ester monomer to flow out from the top of the column; and taking out the resulting ethylene-vinyl ester copolymer solution free from the unreacted vinyl ester monomer from the bottom of the column.

The saponification may be carried out by a known method. In a typical method, a saponification reaction is started by adding a saponification catalyst to the ethylene-vinyl ester copolymer solution free from the unreacted vinyl ester monomer.

The saponification may be carried out on a continuous basis or on a batch basis.

Examples of the saponification catalyst include alkali catalysts such as sodium hydroxide, potassium hydroxide, and alkali metal alcoholates, which may be used alone or in combination.

Saponification conditions vary depending on the saponification catalyst to be used, the ethylene structural unit content of the ethylene-vinyl ester copolymer, and an intended saponification degree. For example, preferred saponification conditions for the batch-based saponification are as follows.

The saponification reaction temperature is 30° C. to 60° C., and the use amount of the saponification catalyst is typically 0.001 to 0.6 equivalents per equivalent of vinyl ester group. The saponification period is typically selected from a range of 1 to 6 hours, depending on the saponification conditions and the intended saponification degree.

Thus, an EVOH solution or slurry is prepared. The EVOH solution or slurry preferably has an EVOH content of about 10 to about 50 wt. %. The EVOH content of the EVOH solution or slurry may be adjusted by using a solvent. An alcohol such as methanol, or a water/alcohol mixed solvent is preferably used as the solvent.

The EVOH to be used in the present disclosure may be a post-modified EVOH such as an urethanized, acetalized, cyanoethylated or oxyalkylenated EVOH.

The EVOH thus prepared mainly contains an ethylene-derived structural unit and a vinyl alcohol structural unit, and further contains a small amount of a vinyl ester structural unit left unsaponified as required. Where the other comonomer is used for the copolymerization, the EVOH further contains a structural unit derived from the other comonomer.

The EVOH to be used in the present disclosure preferably has the following formulation.

The EVOH typically has an ethylene structural unit content of 20 to 60 mol %, preferably 25 to 50 mol %, as measured in conformity with ISO14663. If the ethylene structural unit content is excessively low, the EVOH tends to be poorer in high-humidity gas barrier property and melt formability. If the ethylene structural unit content is excessively high, on the other hand, the EVOH tends to be poorer in gas barrier property.

The saponification degree of the vinyl ester component in the EVOH is typically 90 to 100 mol %, preferably 95 to 100 mol %, as measured in conformity with JIS K6726 (by using a solution prepared by homogeneously dissolving the EVOH in a water/methanol solvent). If the saponification degree is excessively low, the EVOH tends to be poorer in gas barrier property, heat stability, moisture resistance, and the like.

<Conjugated Polyene>

In the present disclosure, the conjugated polyene is present in not less than a predetermined amount in the surface portions of the EVOH composition pellets, whereby the fisheye-suppressing effect can be provided. Although a mechanism for the fisheye-suppressing effect is not clarified, the fisheye-suppressing effect can be provided supposedly because the conjugated polyene present in not less than the predetermined amount in the pellet surfaces functions to trap radicals which may locally occur in the near-surface portions of the pellets when the pellet surfaces are brought into contact with high-temperature metal portions of a barrel, a screw, and the like of the extruder during the melting of the EVOH composition pellets in the extruder.

The conjugated polyene to be used in the present disclosure is a compound containing so-called conjugated double bonds, i.e., having a structure such that carbon-carbon double bonds and carbon-carbon single bonds are alternately connected to each other and the number of the carbon-carbon double bonds is two or more. The conjugated polyene may be a conjugated diene having a structure such that two carbon-carbon double bonds and one carbon-carbon single bond are alternately connected to each other, a conjugated triene having a structure such that three carbon-carbon double bonds and two carbon-carbon single bonds are alternately connected to each other, or a conjugated polyene having a structure such that more than three carbon-carbon double bonds and more than two carbon-carbon single bonds are alternately connected to each other. However, a conjugated polyene having eight or more conjugated carbon-carbon double bonds is colored, so that a product formed from an EVOH composition containing such a conjugated polyene is liable to be colored. Therefore, a conjugated polyene having seven or less conjugated carbon-carbon double bonds is preferred. The conjugated polyene may have a structure such that plural sets of conjugated double bonds each including two or more carbon-carbon double bonds are present in an unconjugated state in its molecule. Tung oil containing three conjugated trienes in its molecule is also an example of the conjugated polyene.

The surface portions of the EVOH composition pellets of the present disclosure have a conjugated polyene content of not lower than 30 ppb, preferably not lower than 34 ppb, more preferably not lower than 38 ppb, based on the weight of the pellets. Where the conjugated polyene content of the pellet surface portions is not lower than the aforementioned level, the occurrence of minute fisheyes having a diameter of not greater than 200 μm can be efficiently suppressed. If the conjugated polyene content is lower, a greater number of fisheyes are liable to occur. The upper limit of the conjugated polyene content of the surface portions is typically 10,000 ppb (10 ppm), preferably 8,000 ppb (8 ppm), particularly preferably 5,000 ppb (5 ppm), especially preferably 1,000 ppb (1 ppm).

The term "the conjugated polyene content of the surface portions" means a conjugated polyene content determined by dissolving 20 g of the EVOH composition pellets of the present disclosure in 30 mL of a mixed solvent having a water/methanol volume ratio of 1/1 with stirring for 10 minutes, measuring the amount of the conjugated polyene contained in the resulting solution by means of liquid chromatography, and then dividing the conjugated polyene amount thus determined by the weight (20 g) of the EVOH composition pellets.

In the present disclosure, the conjugated polyene content of the pellet surface portions of the EVOH composition pellets determined by the aforementioned measurement method is at least required to be not lower than 30 ppb. This means that the conjugated polyene may be almost absent in inner portions of the EVOH composition pellets, or that a greater amount of the conjugated polyene may be present in the inner portions of the EVOH composition pellets.

Where the conjugated polyene is added as the polymerization inhibitor in the EVOH production process, for example, the pellet inner portions of the EVOH composition pellets tend to have a higher conjugated polyene content.

Where the conjugated polyene is also present in the inner portions of the EVOH composition pellets, the overall conjugated polyene content is typically 0.1 to 10,000 ppm, preferably 0.5 to 8,000 ppm, more preferably 1 to 5,000 ppm, particularly preferably 1 to 2,000 ppm, especially preferably 1 to 800 ppm, based on the weight of the pellets. If the overall conjugated polyene content is excessively low, the conjugated polyene content of the pellet surface portions will be relatively reduced, resulting in a greater number of fisheyes. If the overall conjugated polyene content is excessively high, the product formed from the EVOH composition pellets is liable to be colored due to the color of the conjugated polyene.

The term "overall conjugated polyene content" means the amount of the conjugated polyene contained in the EVOH composition pellets, more specifically, a conjugated polyene content determined by pulverizing the EVOH composition pellets, extracting the conjugated polyene from the pulverized pellets with the use of a solvent, analyzing the resulting extraction solvent by liquid chromatography to measure the amount of the conjugated polyene contained in the extraction solvent, and converting the measurement value.

The weight-based content ratio (surface conjugated polyene content/overall conjugated polyene content) between the conjugated polyene content of the pellet surface portions of the EVOH composition pellets and the overall conjugated polyene content of the EVOH composition pellets is typically not lower than $1.5 \times 10^{-5}$, preferably not lower than $3 \times 10^{-5}$, more preferably not lower than $5 \times 10^{-5}$, particularly preferably not lower than $1.5 \times 10^{-4}$, especially preferably not lower than $2 \times 10^{-4}$. If the weight-based content ratio between the conjugated polyene content of the pellet surface portions and the overall conjugated polyene content of the pellets is excessively low, the EVOH composition pellets tend to be poorer in fisheye-suppressing effect. The upper limit of the weight-based content ratio is typically $1 \times 10^{-2}$.

Examples of the conjugated polyene to be used in the present disclosure include: conjugated dienes, such as isoprene, 2,3-dimethyl-1,3-butadiene, 2,3-diethyl-1,3-butadiene, 2-t-butyl-1,3-butadiene, 1,3-pentadiene, 2,3-dimethyl-1,3-pentadiene, 2,4-dimethyl-1,3-pentadiene, 3,4-dimethyl-1,3-pentadiene, 3-ethyl-1,3-pentadiene, 2-methyl-1,3-pentadiene, 3-methyl-1,3-pentadiene, 4-methyl-1,3-pentadiene, 1,3-hexadiene, 2,4-hexadiene, 2,5-dimethyl-2,4-hexadiene, 1,3-octadiene, 1,3-cyclopentadiene, 1,3-cyclohexadiene, 1-phenyl-1,3-butadiene, 1,4-diphenyl-1,3-butadiene, 1-methoxy-1,3-butadiene, 2-methoxy-1,3-butadiene, 1-ethoxy-1,3-butadiene, 2-ethoxy-1,3-butadiene, 2-nitro-1,3-butadiene, chloroprene, l-chloro-1,3-butadiene, 1-bromo-1,3-butadiene, 2-bromo-1,3-butadiene, fulvene, tropone, ocimene, phellandrene, myrcene, farnesene, cembrene, sorbic acid, sorbic acid esters, sorbic acid salts, and abietic acid, each having a conjugated structure containing two carbon-carbon double bonds; conjugated trienes, such as 1,3,5-hexatriene, 2,4,6-octatriene-1-carboxylic acid, eleostearic acid, tung oil, and cholecalciferol, each having a conjugated structure containing three carbon-carbon double bonds; and conjugated polyenes, such as cyclooctatetraene, 2,4,6,8-decatetraene-1-carboxylic acid, retinol, and retinoic acid, each having a conjugated structure containing four or more carbon-carbon double bonds. Of these conjugated polyenes, 1,3-pentadiene, myrcene, and farnesene each have a plurality of stereoisomers, which are all usable. These conjugated polyenes may be used alone or in combination.

Of these, sorbic acid, the sorbic acid esters, and the sorbic acid salts, which each have a carboxyl group and hence have higher water affinity, are particularly preferred, because the amount of the conjugated polyene adhering to the EVOH pellet surfaces can be easily controlled.

The EVOH composition pellets of the present disclosure contain, in addition to the above conjugated polyene, a predetermined amount of at least one component selected from the following components (A) to (C) as the fisheye-suppressing components:

(A) 10 to 400 ppm of a lubricant based on the weight of the EVOH composition pellets;
(B) 10 to 250 ppm of a boron compound based on the weight of the EVOH composition pellets;
(C) 1 to 500 ppm of an alkali metal based on the weight of the EVOH composition pellets.

<<(A) Use of Lubricant as Fisheye-Suppressing Component>>

The use of the lubricant as the fisheye-suppressing component in the present disclosure will hereinafter be described.

The lubricant content of the EVOH composition pellets of the present disclosure is 10 to 400 ppm, preferably 30 to 370 ppm, more preferably 50 to 350 ppm, based on the weight of the pellets. If the lubricant content is excessively low, the friction between surfaces of the screw of the extruder and the EVOH composition pellets is increased, making it impossible to stably feed the pellets. This will increase the fisheyes. If the lubricant content is excessively high, the lubricant will be insufficiently dispersed to agglomerate. This will conversely increase the fisheyes. Further, the friction between the EVOH composition pellets and the screw surfaces will be reduced, making it impossible to stably feed the pellets. This will increase the fisheyes.

In general, if the EVOH pellets are fed into the extruder with no lubricant added thereto, the EVOH pellets are liable to be poorly bit by the screw of the extruder due to higher frictional forces on the pellet surfaces. Therefore, the EVOH pellets are liable to gradually stagnate when being fed into the extruder. The stagnating EVOH pellets are constantly exposed to a high temperature to be thereby thermally degraded. This supposedly increases the fisheyes. Therefore, the addition of the lubricant to the EVOH pellets reduces the friction between the EVOH pellets and the screw surfaces, and makes it possible to smoothly feed the EVOH pellets into the extruder. Thus, the EVOH pellets are less liable to be thermally degraded. This supposedly suppresses the fisheyes.

When the EVOH pellets are not bit by the screw, the pellet surface portions are more easily heated. In the present disclosure, however, radicals generated when molecules of the EVOH are cut by the heat or the like are trapped by the conjugated polyene contained in not less than the predetermined amount in the pellet surface portions. Thus, the lubricant and the conjugated polyene supposedly synergistically suppress the occurrence of the fisheyes.

Examples of the lubricant to be used in the present disclosure include: higher fatty acids such as lauric acid, myristic acid, palmitic acid, stearic acid, behenic acid, and oleic acid; metal salts of the higher fatty acids such as aluminum salts, calcium salts, zinc salts, magnesium salts, and barium salts of the higher fatty acids; esters of the higher fatty acids such as methyl esters, isopropyl esters, butyl esters, and octyl esters of the higher fatty acids; and amides of the higher fatty acids including saturated higher fatty acid amides such as stearamide and behenamide, unsaturated higher fatty acid amides such as oleamide and erucamide, and bis-higher fatty acid amides such as ethylene bis-stearamide, ethylene bis-oleamide, ethylene bis-erucamide, and ethylene bis-lauramide. Other examples of the lubricant include: low-molecular-weight polyolefins such as low-molecular-weight polyethylenes and low-molecular-weight polypropylenes each having a molecular weight of about 500 to about 10,000, and acid modification products of these low-molecular-weight polyolefins; and higher alcohols, ester oligomers, and fluorinated ethylene resins. These may be used alone or in combination. Of the above compounds for use as the lubricant, the higher fatty acids are preferred for extrusion stability and commercial availability. The higher fatty acids typically each have a carbon number of 12 to 25, preferably 12 to 23, particularly preferably 15 to 20, in a molecule thereof. Of the above compounds for use as the lubricant, the higher fatty acids typically each have a valence of 1 to 5, preferably 1 to 3, particularly preferably 1 to 2, from the viewpoint of the extrusion stability and the commercial availability. Here, the valence means the number of structures derived from a higher fatty acid in one molecule of the compound to be used as the lubricant. Where a bis-stearamide is used as the lubricant, for example, two structures each derived from a C18 higher fatty acid molecule are contained in a molecule of the bis-stearamide and, therefore, the bis-stearamide is regarded as an amide of the C18 higher fatty acid having a higher fatty acid valence of 2. Of these, the higher fatty acids, the metal salts of the higher fatty acids, the esters of the higher fatty acids, and the amides of the higher fatty acids are preferred, and the metal salts of the higher fatty acids and the amides of the higher fatty acids are particularly preferred. Further, the amides of the higher fatty acids are more preferred for extrusion stability.

The lubricant may be used in any form, e.g., solid form (powdery form, particulate form or flake form), semisolid form, liquid form, paste form, solution form, emulsion form (aqueous dispersion form) or the like. Particularly, the powdery lubricant is preferred. The powdery lubricant typically has a particle diameter of 0.1 to 100 μm, preferably 1 to 75 μm, particularly preferably 5 to 50 μm.

In the present disclosure, the term "the lubricant content" of the EVOH composition pellets means the amount of the lubricant contained in the surfaces of the EVOH composition pellets and/or within the EVOH composition pellets, and is determined, for example, by the following method.

<Determination of Lubricant Content>

Where the lubricant is added to the EVOH composition pellets to adhere to the surfaces of the EVOH composition pellets, the amount of the added lubricant may be regarded as the lubricant content. Where the lubricant is contained within the EVOH composition pellets and the lubricant is a higher fatty acid amide, for example, the lubricant content of the EVOH composition pellets is determined by measuring the total nitrogen amount of the EVOH composition pellets by means of a total trace nitrogen analyzer, and converting the total nitrogen amount into the lubricant content.

<<(B) Use of Boron Compound as Fisheye-Suppressing Component>>

The use of the boron compound as the fisheye-suppressing component in the present disclosure will hereinafter be described.

The boron compound content of the EVOH composition pellets of the present disclosure is 10 to 250 ppm, preferably 15 to 230 ppm, more preferably 18 to 200 ppm, on a boron basis based on the weight of the pellets. If the boron compound content is excessively low, a film formed from the EVOH composition pellets is liable to suffer from the occurrence of the minute fisheyes. If the boron compound content is excessively high, the boron compound is liable to agglomerate, resulting in local crosslinking of the EVOH. This will cause the fisheyes.

Although a mechanism for providing a very high fisheye-suppressing effect by incorporating the boron compound to the pellets is not clarified, the fisheye-suppressing effect is provided supposedly because the boron compound present in the EVOH composition cooperates with hydroxyl groups of the EVOH to form a moderately crosslinked structure and functions to allow the entire EVOH composition to have a uniform viscosity in a melted state.

When the EVOH contacts the high-temperature metal portions, molecules of the EVOH are liable to be cut to generate radicals, which sequentially crosslink molecular chains one after another, thereby causing fisheyes. As described above, the conjugated polyene traps the radicals generated when the EVOH molecules are cut, whereby the molecular chains are prevented from being crosslinked with each other in the EVOH with the radicals thus trapped. This suppresses the sequential crosslinking reaction. Further, the EVOH with its molecules cut has a lower molecular weight and hence a lower viscosity. If the boron compound is not present in the EVOH composition, the EVOH composition is liable to have a nonuniform viscosity. Therefore, a part of the EVOH composition having a reduced viscosity is liable to move to an inner wall of a flow passage to be thereby thermally degraded. This supposedly causes the fisheyes. Where the boron compound is present in the EVOH composition, in contrast, the entire EVOH composition has a uniform viscosity in a melted state, thereby supposedly making it possible to suppress the occurrence of the fisheyes.

Boric acid or its metal salt is used as the boron compound. Examples of the boron compound include sodium borates (sodium metaborate, sodium diborate, sodium tetraborate, sodium pentaborate, sodium hexaborate, sodium octaborate, and the like), potassium borates (potassium metaborate, potassium tetraborate, potassium pentaborate, potassium hexaborate, potassium octaborate, and the like), lithium borates (lithium metaborate, lithium tetraborate, lithium pentaborate, and the like), calcium borate, barium borates (barium orthoborate, barium metaborate, barium diborate, barium tetraborate, and the like), magnesium borates (magnesium orthoborate, magnesium diborate, magnesium metaborate, trimagnesium tetraborate, pentamagnesium tetraborate, and the like), manganese borates (manganese borate, manganese metaborate, manganese tetraborate, and the like), cobalt borate, zinc borates (zinc tetraborate, zinc metaborate, and the like), cadmium borates (cadmium orthoborate, cadmium tetraborate, and the like), silver borates (silver metaborate, silver tetraborate, and the like), copper borates (cupric borate, copper metaborate, copper tetraborate, and the like), nickel borates (nickel orthoborate, nickel diborate, nickel tetraborate, nickel octaborate, and the like), aluminum potassium borate, ammonium borates (ammonium metaborate, ammonium tetraborate, ammonium pentaborate, ammonium octaborate, and the like), lead borates (lead metaborate, lead hexaborate, and the like), bismuth borate, and boric acid salt minerals such as borax, kernite, inyoite, kotoite, suanite, and szaibelyite. Of these, borax and boric acid are preferred. These may be used alone or in combination.

The boron compound may be used in any form, e.g., solid form (powdery form, particulate form or flake form), semisolid form, liquid form, paste form, solution form, emulsion form (aqueous dispersion form) or the like. Particularly, the powdery boron compound is preferred. The powdery boron compound typically has a particle diameter of 0.1 to 100 μm, preferably 1 to 75 μm, particularly preferably 5 to 50 μm.

In the present disclosure, the term "the boron compound content" of the EVOH composition pellets means the amount of the boron compound contained in the surfaces of the EVOH composition pellets and/or within the EVOH composition pellets, and is determined, for example, by the following method.

<Determination of Boron Compound Content>

Where the boron compound is added to the EVOH composition pellets to adhere to the surfaces of the EVOH composition pellets, the amount of the added boron compound (on a boron basis) may be regarded as the boron compound content. Where the boron compound is contained within the EVOH composition pellets, the boron compound content is determined, for example, by treating the EVOH composition pellets together with concentrated nitric acid by a microwave decomposition method, diluting the resulting solution with purified water to a predetermined volume to prepare a sample liquid, measuring the amount of boron contained in the sample liquid by means of an inductively coupled plasma emission spectrometer (ICP-AES), and converting the boron amount into a boron content based on the weight of the EVOH composition pellets.

<<(C) Use of Alkali Metal as Fisheye-Suppressing Component>>

The use of the alkali metal as the fisheye-suppressing component in the present disclosure will hereinafter be described.

The alkali metal content of the EVOH composition pellets of the present disclosure is typically 1 to 500 ppm, preferably 50 to 230 ppm, more preferably 100 to 180 ppm, based on the weight of the pellets. If the alkali metal content is excessively low, the minute fisheyes are liable to occur in a film formed from the EVOH composition pellets. If the alkali metal content is excessively high, the minute fisheyes are also liable to occur in the film.

A mechanism for suppressing the fisheyes with the use of the alkali metal in the present disclosure is supposedly as follows. When the conjugated polyene is added to the EVOH, the pH of the EVOH is turned to an acidic level or an alkaline level, so that an unexpected side reaction such as decomposition or crosslinking is liable to occur.

Particularly, the near-surface portions of the pellets are liable to be thermally influenced in the extruder or the like. Without adjusting the pH, it will be impossible to sufficiently provide the fisheye-suppressing effect. Where the EVOH contains the alkali metal, the pH of the EVOH composition, particularly, the pH of the pellet near-surface portions, can be controlled in a proper pH range by the buffer action of the alkali metal. This supposedly further improves the fisheye-suppressing effect.

Examples of the alkali metal to be used in the present disclosure include lithium, sodium, potassium, rubidium, and cesium, which may be used alone or in combination. Of these, sodium and potassium are preferred, and sodium is particularly preferred. Where two or more alkali metals are used in combination, the alkali metal content is the total amount of the alkali metals.

Exemplary alkali metal sources for incorporating the alkali metal to the EVOH composition pellets of the present disclosure include alkali metal compounds such as alkali metal oxides, alkali metal hydroxides, and alkali metal salts. These alkali metal compounds are preferably water-soluble. Particularly, the alkali metal salts are preferred for dispersibility.

The alkali metal compounds to be used in the present disclosure preferably exclude inorganic lamellar compounds and double salts from the viewpoint of economy and dispersibility.

Where an alkali metal salt is used as the alkali metal compound, for example, the alkali metal salt may be present in an ionized form or in the form of an alkali metal complex with a resin or other ligands.

Examples of the alkali metal salts include: inorganic salts such as carbonates, hydrogen carbonates, phosphates, borates, sulfates, and chlorides of the alkali metals; C2 to C11 monocarboxylates such as acetates, butyrates, propionates, enanthates, and caprates of the alkali metals; C2 to C11 dicarboxylates such as oxalates, malonates, succinates, adipates, suberates, and sebacates of the alkali metals; and carboxylates such as provided by bonding the alkali metals to polymer terminal carboxyl groups of the EVOH. These may be used alone or in combination. The alkali metal compounds typically have a molecular weight of 20 to 10,000, preferably 20 to 1,000, particularly preferably 20 to 500.

Of these, the carboxylates of the alkali metals are preferred, and the C2 to C11 carboxylates of the alkali metals are particularly preferred. Further, aliphatic C2 to C11 carboxylates of the alkali metals are more preferred, and aliphatic C2 to C6 monocarboxylates of the alkali metals are especially preferred. Particularly, the acetates of the alkali metals are most preferred.

In the present disclosure, the term "the alkali metal content" of the EVOH composition pellets means the amount of the alkali metal contained in the surfaces of the EVOH composition pellets and/or within the EVOH composition pellets, and is determined, for example, in the following manner.

<Determination of Alkali Metal Content>

Where the alkali metal is contained in the surfaces of the EVOH composition pellets, the alkali metal amount of the alkali metal compound added to the surfaces of the EVOH pellets may be regarded as the alkali metal content. Where the alkali metal is contained within the EVOH composition pellets, the alkali metal content is determined, for example, by ashing the EVOH composition pellets in a dry state, dissolving the resulting ash in an hydrochloric acid aqueous solution, analyzing the resulting hydrochloric acid aqueous solution by means of an inductively coupled plasma emission spectrometer (ICP-AES), fitting the result of the analysis to a calibration line prepared by using standard solutions to determine an alkali metal amount, and converting the alkali metal amount to the overall alkali metal content of the EVOH composition pellets.

The lubricant, the boron compound, and the alkali metal may be used alone or in combination as the fisheye-suppressing component for the EVOH composition pellets of the present disclosure.

[Other Ingredients]

The EVOH composition pellets of the present disclosure may contain a resin composition prepared by mixing a resin, other than the EVOH, generally used for the EVOH composition in an amount (e.g., not greater than 20 wt. %, preferably not greater than 10 wt. %) that does not impair the effects of the present disclosure.

As required, the EVOH composition pellets of the present disclosure may contain additives that are generally added to the EVOH. Examples of the additives include heat stabilizer, antioxidant, antistatic agent, colorant, UV absorber, plasticizer, light stabilizer, surfactant, antibacterial agent, drying agent, anti-blocking agent, flame retardant, crosslinking agent, curing agent, foaming agent, nucleating agent, anti-fogging agent, biodegradation agent, silane coupling agent, oxygen absorber, filler, and reinforcing material such as fibers. Particularly, an acid or a partial salt of a polybasic acid such as phosphoric acid, pyrophosphoric acid, phosphorous acid, oxalic acid, succinic acid, adipic acid, tartaric acid, citric acid, dihydrogen sodium phosphate, dihydrogen potassium phosphate, or acetic acid may be contained in the EVOH composition pellets. These may be used alone or in combination. Where an alkali metal is contained in any of the other ingredients, the alkali metal content of the other ingredients is included in the alkali metal content specified in the present disclosure.

Next, a method of producing the EVOH pellets and a method for producing the EVOH composition pellets of the present disclosure will be described.

<Production of EVOH Pellets>

A conventionally known method may be used for the production of pellets from the EVOH. Examples of the method include:

a) a hot cutting method including the steps of extruding the EVOH in a fluid state from an extrusion head of an extruder, cutting the extruded EVOH in a melted state, and cooling and solidifying the resulting pieces of the extruded EVOH into pellets; and b) a strand cutting method including the steps of extruding the EVOH in a fluid state into a solidification bath, cooling and solidifying the extruded EVOH, and cutting the resulting EVOH strands.

For production of porous pellets to be described later, the strand cutting method (b) is preferred.

The EVOH to be used as a material for the pellets in the hot cutting method (a) and the strand cutting method (b) described above is:

(α) an EVOH solution or slurry or an EVOH hydrous composition (hereinafter sometimes referred to as "EVOH solution/hydrous composition") prepared by the saponification in the EVOH production method; or (β) a melted-state EVOH prepared by melting the pellets of the EVOH (dry EVOH).

The EVOH hydrous composition is an EVOH composition prepared by properly adjusting the water content of the EVOH solution or slurry with the use of a solvent. The EVOH hydrous composition typically has an EVOH concentration of 20 to 60 wt. %.

Usable examples of the solvent include alcohol, and water/alcohol mixed solvent. Particularly, the water/alcohol mixed solvent is preferred. Examples of the alcohol include C1 to C10 aliphatic alcohols such as methanol, ethanol, propanol, n-butanol, and t-butanol. Particularly, methanol is preferred. The water/alcohol mixing weight ratio is preferably 80/20 to 5/95.

The EVOH hydrous composition typically contains 0 to 10 parts by weight of the alcohol and 10 to 500 parts by weight of water based on 100 parts by weight of the EVOH.

The method of adjusting the water content of the EVOH solution or slurry is not particularly limited. Exemplary methods for increasing the water content include: a method in which the solvent is sprayed over the EVOH solution or slurry; a method in which the EVOH solution or slurry is mixed with the solvent; and a method in which the EVOH solution or slurry is brought into contact with vapor of the solvent. The water content may be reduced by properly drying the EVOH solution or slurry, for example, by a hot air dryer of fluidized type or a hot air dryer of stationary type.

Next, the hot cutting method (a) and the strand cutting method (b) will be described.

a) Hot Cutting Method

Where the EVOH solution/hydrous composition is fed as the pellet material into the extruder, the temperature of the EVOH solution/hydrous composition in the extruder is preferably 70° C. to 170° C., more preferably 80° C. to 170° C., still more preferably 90° C. to 170° C. If the temperature of the EVOH solution/hydrous composition is excessively low, it will be difficult to completely melt the EVOH. If the temperature of the EVOH solution/hydrous composition is excessively high, the EVOH is susceptible to thermal degradation.

Where the dry EVOH is fed as the pellet material into the extruder, the temperature of the dry EVOH in the extruder is preferably 150° C. to 300° C., more preferably 160° C. to 280° C., still more preferably 170° C. to 250° C.

The temperature of the EVOH solution/hydrous composition and the temperature of the dry EVOH are each defined as a temperature detected around the extrusion head provided at the distal end of the extruder by means of a temperature sensor disposed in the cylinder of the extruder.

The EVOH solution/hydrous composition extruded from the die of the extruder, i.e., the melted-state EVOH, is cut before being cooled and solidified. Exemplary cutting methods include: an in-air hot cutting method in which the extruded EVOH is cut in air; and an in-water cutting method in which the EVOH is extruded in a container filled with cooling water (cooling liquid) and provided with a cutter, and cut in the cooling water.

In the in-water cutting method, the temperature of the cooling water is such that the EVOH extruded in the melted state is not instantly hardened (solidified). Where the EVOH solution/hydrous composition is used as the material, the temperature of the cooling water is preferably −20° C. to 50° C., more preferably −5° C. to 30° C.

Where the dry EVOH is used as the material, the EVOH is more easily solidified than in the case where the EVOH solution/hydrous composition is used as the material. Therefore, the temperature of the cooling water in the in-water cutting method is higher than in the case where the EVOH solution/hydrous composition is used as the material, and is typically 0° C. to 90° C., preferably 20° C. to 70° C.

The cooling liquid is not limited to water, but other usable examples of the cooling liquid include water/alcohol mixed solution, aromatic hydrocarbons such as benzene, ketones such as acetone and methyl ethyl ketone, ethers such as dipropyl ether, and organic esters such as methyl acetate, ethyl acetate, and methyl propionate. Of these, water or the water/alcohol mixed solution is used from the viewpoint of easy handling. The water/alcohol weight ratio of the water/alcohol mixed solution is typically 90/10 to 99/1. Usable examples of the alcohol include lower alcohols such as methanol, ethanol, and propanol. Of these, methanol is industrially preferred.

b) Strand Cutting Method

Where the EVOH solution/hydrous composition is fed as the pellet material into the extruder, the temperature of the EVOH to be extruded in the solidification bath is typically 10° C. to 100° C. The temperature of the solidification bath is such that the extruded EVOH can be cooled and solidified, and is typically −10° C. to 40° C. The retention time is typically about 10 to about 400 seconds.

Where the dry EVOH is fed as the pellet material into the extruder, the temperature of the EVOH to be extruded in the solidification bath is typically 150° C. to 300° C. The temperature of the solidification bath is typically 0° C. to 90° C., and the retention time is about 2 to about 400 seconds.

The same solution as described for the cooling liquid to be used in the hot cutting method (a) may be used as a solidification liquid for the solidification bath.

Thus, the EVOH pellets are prepared.

The EVOH pellets produced in the aforementioned manner are preferably porous EVOH pellets from the viewpoint of a conjugated polyene incorporating process to be described later. The porous pellets can be prepared by using an EVOH alcohol solution or an EVOH water/alcohol solution (EVOH hydrous composition) as the pellet material in the strand cutting method (b). Where the EVOH pellets are porous, the conjugated polyene is infiltrated into pores of the EVOH pellets to be thereby easily retained in the pellets. Thus, the conjugated polyene can be efficiently incorporated to the pellet surface portions. The size of the pores of the porous pellets is not particularly limited, as long as the conjugated polyene can be infiltrated into the pores.

The shape of the EVOH pellets generally depends upon the pellet production method, and may be any of various shapes. The EVOH pellets produced by the aforementioned methods and the EVOH composition pellets of the present disclosure may have any desired shape. The pellets may each have, for example, spherical shape, oval shape, cylindrical shape, cubic shape, square prism shape, irregular shape, or the like, and typically the oval shape or the cylindrical shape. The oval pellets typically each have a major diameter of 1 to 10 mm and a minor diameter of 1 to 6 mm, preferably a major diameter of 2 to 7 mm and a minor diameter of 2 to 5 mm, and the cylindrical pellets typically each have a bottom diameter of 1 to 10 mm and a length of 1 to 10 mm, preferably a bottom diameter of 2 to 7 mm and a length of 3 to 8 mm, for easier handling thereof in subsequent use as a forming material.

The EVOH solution/hydrous composition to be used as the pellet material typically contains the alkali catalyst used for the saponification, by-produced salts, and other impurities. Therefore, the EVOH pellets prepared by using the EVOH solution/hydrous composition as the pellet material generally contain the aforementioned impurities and, therefore, may be rinsed with water.

Where the EVOH pellets prepared by using the conjugated polyene as the polymerization inhibitor in the EVOH production process are rinsed with water, the conjugated polyene added as the polymerization inhibitor is also removed. However, the removability of the conjugated polyene varies depending upon the polarity of the conjugated polyene, so that a certain amount of the conjugated polyene remains in the EVOH pellets.

<EVOH Composition Pellet Production Method>

The EVOH composition pellets of the present disclosure containing the conjugated polyene and the fisheye-suppressing component are produced by performing a process for producing EVOH pellets containing the conjugated polyene and a process for producing EVOH pellets containing the fisheye-suppressing component. These processes may be simultaneously performed, or one of the processes may precede or follow the other process. Where these processes are simultaneously performed, a solution containing the conjugated polyene and the fisheye-suppressing component dissolved therein may be used as a treatment liquid for the processes.

<Production of Conjugated Polyene-Containing EVOH Pellets>

The conjugated polyene-containing EVOH pellets can be produced by incorporating the conjugated polyene to the surfaces of the EVOH pellets.

Exemplary methods for incorporating the conjugated polyene to the EVOH pellet surfaces include: a method in which the EVOH pellets preliminarily prepared are brought into contact with the conjugated polyene; and a method in which the conjugated polyene is incorporated to the EVOH pellets in the EVOH pellet production process.

As described above, the conjugated polyene can be used as the polymerization inhibitor. Therefore, the conjugated polyene-containing EVOH pellets can be produced by adding the conjugated polyene as the polymerization inhibitor at the end of the polymerization. However, the conjugated polyene is generally uniformly present in the EVOH pellets produced by this method, so that the surface portions of the EVOH pellets are liable to have a lower conjugated polyene content. If the amount of the conjugated polyene to be added as the polymerization inhibitor is increased, the coloration of the pellets will result. Therefore, the pellets often need to be rinsed with water after the production thereof. This generally makes it difficult to control the conjugated polyene content of the pellet surface portions to a level ensuring the fisheye-suppressing effect in the EVOH pellet production process.

Therefore, the method in which the EVOH pellets preliminarily prepared are brought into contact with the conjugated polyene is preferred for incorporating the conjugated polyene to the surface portions of the EVOH pellets.

In an exemplary method for bringing the preliminarily prepared EVOH pellets into contact with the conjugated polyene, the EVOH pellets are preferably brought into contact with a treatment liquid containing the conjugated polyene (hereinafter sometimes referred to as "conjugated polyene-containing treatment liquid"). Another preferred contact method is such that the conjugated polyene is directly added to and mixed with the EVOH pellets.

Examples of the method for bringing the EVOH pellets into contact with the conjugated polyene-containing treatment liquid include: a method in which the conjugated polyene-containing treatment liquid is sprayed over the EVOH pellets; a method in which the EVOH pellets are immersed in the conjugated polyene-containing treatment liquid; a method in which the EVOH pellets are rinsed with the conjugated polyene-containing treatment liquid; and a solution coating method in which the surfaces of the EVOH pellets are controlled at a predetermined high temperature and coated with the conjugated polyene-containing treatment liquid by spraying the conjugated polyene-containing treatment liquid over the EVOH pellets. Of these, the method in which the EVOH pellets are immersed in the conjugated polyene-containing treatment liquid, and the method in which the EVOH pellets are rinsed with the conjugated polyene-containing treatment liquid are preferably used.

The method for bringing the EVOH pellets into contact with the conjugated polyene-containing treatment liquid makes it possible to efficiently increase the conjugated polyene content of the EVOH pellet surface portions. Further, this method is advantageous in that the conjugated polyene content of the pellet surface portions can be precisely controlled by adjusting the conjugated polyene concentration of the treatment liquid.

The conjugated polyene concentration of the conjugated polyene-containing treatment liquid is typically 0.01 to 500 ppm, preferably 0.1 to 50 ppm, based on the weight of the conjugated polyene-containing treatment liquid. If the conjugated polyene concentration is excessively low, it will be difficult to incorporate the predetermined amount of the conjugated polyene to the EVOH pellets. If the conjugated polyene concentration is excessively high, the conjugated polyene is liable to deposit on the pellet surfaces to agglomerate in the form of blobs in a film formed from the EVOH composition pellets.

The conjugated polyene content of the surface portions may be controlled by changing the conjugated polyene concentration of the conjugated polyene-containing treatment liquid, the period of the contact process, the temperature for the contact process, the stirring speed in the contact process, the water content of the EVOH pellets to be subjected to the contact process, and the like.

The pellets subjected to the conjugated polyene contact process may be used as they are in the subsequent step, but are generally preferably dried. A known drying method may be employed for the drying. Examples of the known drying method include a fluidized drying method using drum/groove type agitation dryer, round pipe dryer, rotary dryer, fluid bed dryer, vibrating fluid bed dryer or conical rotor type dryer, and a stationary drying method using batch box type dryer, band dryer, tunnel dryer or vertical silo dryer. The conjugated polyene-containing EVOH pellets can be efficiently dried by passing gas such as nitrogen gas at 80° C. to 150° C. through the dryer.

Thus, the conjugated polyene-containing EVOH pellets are produced.

<Production of Lubricant-Containing EVOH Pellets>

A process for producing EVOH pellets containing the lubricant when the lubricant is used as the fisheye-suppressing component will be described. The lubricant-containing EVOH pellets can be produced by incorporating the lubricant to the EVOH pellets.

In an exemplary method for incorporating the lubricant to the EVOH pellets, the EVOH pellets preliminarily prepared are preferably brought into contact with the lubricant. Another preferred method is such that the lubricant is incorporated to the EVOH pellets by bringing the EVOH pellets into contact with the lubricant in the EVOH pellet production process.

Examples of the method for bringing the preliminarily prepared EVOH pellets into contact with the lubricant include: a method in which a treatment liquid containing a lubricant (hereinafter sometimes referred to as "lubricant-containing treatment liquid") is sprayed over the EVOH pellets; a method in which the EVOH pellets are immersed in the lubricant-containing treatment liquid; a method in which the EVOH pellets are fed into the lubricant-containing treatment liquid with stirring; and a method in which the powdery lubricant is directly added to and mixed with the EVOH pellets. Of these methods, the method in which the powdery lubricant is directly added to and mixed with the EVOH pellets is preferred because the lubricant can be efficiently incorporated to the EVOH pellets.

Where the powdery lubricant is added directly to the EVOH pellets, the amount of the added lubricant may be regarded as the lubricant content of the EVOH pellets. The amount of the lubricant to be added is typically 10 to 400 ppm, preferably 30 to 370 ppm, particularly preferably 50 to 350 ppm, based on the weight of the EVOH pellets. If the amount of the added lubricant is excessively small, great friction tends to occur between the EVOH pellets and the screw surfaces of the extruder. This will prevent the stable feeding of the pellets, thereby increasing the fisheyes. If the amount of the added lubricant is excessively great, the lubricant is liable to be insufficiently dispersed over the EVOH pellets to agglomerate on the EVOH pellets. This will conversely increase the fisheyes. Further, the friction between the EVOH pellets and the screw surfaces tends to be reduced. This will prevent the stable feeding of the pellets, thereby increasing the fisheyes.

Thus, the lubricant-containing EVOH pellets are produced by the above process.

<Production of Boron Compound-Containing EVOH Pellets>

A process for producing EVOH pellets containing the boron compound when the boron compound is used as the fisheye-suppressing component will be described. The boron compound-containing EVOH pellets can be produced by incorporating the boron compound to the EVOH pellets.

Preferred examples of a method for incorporating the boron compound to the EVOH pellets include: a method in which the preliminarily prepared EVOH pellets are brought into contact with the boron compound, and a method in which the boron compound is incorporated to the EVOH pellets in the EVOH pellet production process. Of these, the method in which the preliminarily prepared EVOH pellets are brought into contact with the boron compound is preferred.

In an exemplary method for bringing the preliminarily prepared EVOH pellets into contact with the boron compound, the EVOH pellets are preferably brought into contact with a treatment liquid containing the boron compound (hereinafter sometimes referred to as "boron compound-containing treatment liquid"). Another preferred contact method is such that the boron compound is directly added to and mixed with the EVOH pellets.

Exemplary methods for bringing the EVOH pellets into contact with the boron compound-containing treatment liquid include: a method in which the boron compound-containing treatment liquid is sprayed over the EVOH pellets; a method in which the EVOH pellets are immersed in the boron compound-containing treatment liquid; a method in which the EVOH pellets are rinsed with the boron compound-containing treatment liquid; and a solution coating method in which the surfaces of the EVOH pellets are controlled at a predetermined high temperature and coated with the boron compound-containing treatment liquid by spraying the boron compound-containing treatment liquid over the EVOH pellets. Of these, the method in which the EVOH pellets are rinsed with the boron compound-containing treatment liquid is preferably used, because the boron compound can be efficiently incorporated to the EVOH pellets.

The boron compound concentration of the boron compound-containing treatment liquid is typically 0.001 to 1 wt. %, preferably 0.003 to 0.5 wt. %, based on the weight of the boron compound-containing treatment liquid. If the boron compound concentration is excessively low, it will be difficult to incorporate the predetermined amount of the boron compound. If the boron compound concentration is excessively high, a final product formed from the EVOH composition pellets tends to be poorer in appearance.

The pellets subjected to the boron compound contact process may be used as they are in the subsequent step, but are preferably dried. The same drying methods as described for drying the conjugated polyene-containing EVOH pellets may be used for drying the boron compound-containing EVOH pellets.

Thus, the boron compound-containing EVOH pellets are produced by the above process.

<Production of Alkali Metal-Containing EVOH Pellets>

A process for producing EVOH pellets containing the alkali metal when the alkali metal is used as the fisheye-suppressing component will be described. The alkali metal-containing EVOH pellets can be produced by incorporating the alkali metal to the EVOH pellets.

The EVOH pellets are generally produced by using an alkali metal hydroxide (e.g., sodium hydroxide or potassium hydroxide) as the saponification catalyst. The alkali metal in the catalyst by-produces an alkali metal acetate in the saponification, or forms a salt together with a carboxyl group slightly occurring at a polymer terminal of the EVOH and, therefore, is inevitably present in the EVOH pellets. In view of this, the amount of the alkali metal present in the EVOH pellets is typically about 3,000 ppm based on the weight of the EVOH pellets in an unrinsed state.

When the alkali metal remains in greater than a predetermined amount in the EVOH pellets, the alkali metal amount can be adjusted by rinsing the EVOH pellets to a greater extent than usual. More specifically, it is difficult to remove the alkali metal from the EVOH pellets simply by rinsing the EVOH pellets with water. Therefore, it is preferred to rinse the EVOH pellets with an acid rinsing liquid such as containing acetic acid and then with water. Particularly, the alkali metal bonded to the polymer terminal carboxyl groups can be efficiently removed by the rinsing with the acid.

Examples of the acid to be use for the rinsing liquid include water-soluble weak acids such as acetic acid, propionic acid, and butyric acid, among which acetic acid is preferred. Examples of the water for use as the rinsing liquid include ion-exchanged water, distilled water, and filtered water, from which metal ions are removed as impurities.

In the present disclosure, a preferred method that ensures easy adjustment of the alkali metal content of the EVOH pellets is such that the alkali metal salt occurring during the saponification process is rinsed away from the EVOH pellets and then the alkali metal is incorporated to the resulting EVOH pellets.

Exemplary methods for incorporating the alkali metal to the EVOH pellets include: a method in which the preliminarily prepared EVOH pellets are brought into contact with the alkali metal compound; and a method in which the alkali metal salt occurring during the saponification process is allowed to remain in the EVOH. Of these, the method in which the preliminarily prepared EVOH pellets are brought into contact with the alkali metal compound is preferred.

In an exemplary method for bringing the preliminarily prepared EVOH pellets into contact with the alkali metal compound, the EVOH pellets are preferably brought into contact with a treatment liquid containing the alkali metal compound (hereinafter sometimes referred to as "alkali metal-containing treatment liquid"). Another preferred contact method is such that the alkali metal compound is directly added to and mixed with the EVOH pellets.

Exemplary methods for bringing the EVOH pellets into contact with the alkali metal-containing treatment liquid include: a method in which the alkali metal-containing treatment liquid is sprayed over the EVOH pellets; a method in which the EVOH pellets are immersed in the alkali metal-containing treatment liquid; a method in which the EVOH pellets are rinsed with the alkali metal-containing treatment liquid; and a solution coating method in which the surfaces of the EVOH pellets are controlled at a predetermined high temperature and coated with the alkali metal-containing treatment liquid by spraying the alkali metal-containing treatment liquid over the EVOH pellets. Of these, the method in which the EVOH pellets are rinsed with the alkali metal-containing treatment liquid is preferably used, because the alkali metal can be efficiently incorporated to the EVOH pellets. This method makes it possible to remove the alkali metal from the EVOH pellets when the alkali metal is contained in excess in the EVOH pellets, and makes it possible to add the alkali metal to the EVOH pellets when the alkali metal is insufficiently contained in the EVOH pellets.

The alkali metal concentration of the alkali metal-containing treatment liquid is typically 0.001 to 1 wt. %, preferably 0.003 to 0.5 wt. %, based on the weight of the alkali metal-containing treatment liquid. If the alkali metal concentration is excessively low, it will be difficult to incorporate the predetermined amount of the alkali metal. If the alkali metal concentration is excessively high, a final product formed from the EVOH composition pellets tends to be poorer in appearance.

The method in which the alkali metal salt occurring during the saponification process is removed from the EVOH pellets and then the resulting EVOH pellets are brought into contact with the alkali metal as described above is preferred for the easy adjustment of the alkali metal content of the EVOH pellets.

The pellets subjected to the alkali metal contact process may be used as they are in the subsequent step, but are preferably dried. The same drying methods as described for drying the conjugated polyene-containing EVOH pellets may be used for drying the alkali metal-containing EVOH pellets.

Thus, the alkali metal-containing EVOH pellets are produced by the above process.

The treatment liquid, which contains at least one of the conjugated polyene and the fisheye-suppressing component, may be used in a process for adjusting the concentration of any of the other preferred additives, particularly, acetic acid and the acetic acid salts (excluding the alkali metal salts). More specifically, the treatment liquid may contain any of the other additives such as acetic acid and the acetic acid salts in addition to at least one of the conjugated polyene and the fisheye-suppressing component. This process makes it possible to easily adjust the content ratio of the other additives, the conjugated polyene, and the fisheye-suppressing component.

The EVOH composition pellets of the present disclosure can be produced by performing the conjugated polyene incorporating process and the fisheye-suppressing component incorporating process.

Particularly, where the lubricant is used as the fisheye-suppressing component, it is preferred, in terms of the working efficiency, to perform the conjugated polyene-containing EVOH pellet production process and then perform the lubricant-containing EVOH pellet production process.

Where the boron compound is used as the fisheye-suppressing component, it is preferred, in terms of the working efficiency, to simultaneously perform the conjugated polyene-containing EVOH pellet production process and the boron compound-containing EVOH pellet production process by using a treatment liquid containing the conjugated polyene and the boron compound.

Where the alkali metal is used as the fisheye-suppressing component, it is preferred, in terms of the working efficiency, to simultaneously perform the conjugated polyene-containing EVOH pellet production process and the alkali metal-containing EVOH pellet production process by using a treatment liquid containing the conjugated polyene and the alkali metal compound.

<EVOH Composition Pellets>

The EVOH composition pellets of the present disclosure typically have a water content of 0.01 to 1 wt. %, preferably 0.05 to 0.5 wt. %. If the water content is excessively low, it will be impossible to plasticize the EVOH by water molecules, so that the EVOH composition pellets cannot be easily melted during the extrusion. This tends to result in defects caused by unmelted portions of the pellets. If the water content is excessively high, a foaming phenomenon is liable to occur in the extrusion, so that a product formed from the EVOH composition pellets tends to be poorer in appearance.

The melt flow rate (MFR) of the EVOH composition pellets of the present disclosure is typically 0.5 to 100 g/10 minutes, preferably 1 to 50 g/10 minutes, particularly preferably 2 to 35 g/10 minutes, as measured at 210° C. with a load of 2160 g. If the MFR is excessively high, the film formability tends to be unstable. If the MFR is excessively low, the viscosity tends to be excessively high, making the extrusion difficult.

<Use Applications>

The EVOH composition pellets of the present disclosure can be formed, for example, into films, sheets, cups, bottles, and the like by a melt-forming process. Examples of the melt-forming process include extrusion process (T-die extrusion, inflation extrusion, blowing, melt-spinning, profile extrusion, and the like), and injection molding process. A melt-forming temperature is typically selected from a range of 150° C. to 300° C. A film, a sheet, a fiber material or the like formed from the EVOH composition pellets may be uniaxially or biaxially stretched.

The EVOH composition pellets of the present disclosure may be used alone as they are in the melt-forming process, or may be blended with pellets of some other thermoplastic resin for use in the melt-forming process. Two or more types of EVOH composition pellets may be used as a mixture. The two or more types of EVOH composition pellets to be used as the mixture may contain EVOHs having different ethylene structural unit contents, different saponification degrees, different MFRs, and different structural units.

Examples of the other thermoplastic resin include polyolefins (e.g., polyethylenes, polypropylenes, poly(1-butene), poly(4-methyl-1-pentene), ethylene-propylene copolymers, copolymers of ethylene and α-olefin having a carbon number of 4 or more, copolymers of polyolefin and maleic anhydride, ethylene-vinyl acetate copolymers, ethylene-acrylate copolymers, polyolefins obtained by graft-modifying any of these polyolefins with an unsaturated carboxylic acid or a derivative of the unsaturated carboxylicacid, and the like), nylons (e.g., nylon-6, nylon-66, and nylon-6/66 copolymers, and the like), polyvinyl chlorides, polyvinylidene chlorides, polyesters, polystyrenes, polyacrylonitriles, polyurethanes, polyacetals, and modified polyvinyl alcohol resins.

Examples of the EVOH composition film formed from the EVOH composition pellets of the present disclosure for practical applications include a single-layer EVOH composition film, and a multilayer structure including at least one EVOH composition film. The EVOH composition pellets of the present disclosure may be used for coextrusion coating or solution coating of a base film such as paper, plastic film or metal foil.

The multilayer structure will hereinafter be described.

For production of the multilayer structure, a layer formed by using the EVOH composition pellets of the present disclosure is laminated with some other base material (a thermoplastic resin or the like) on one or both sides thereof. Exemplary laminating methods include: a laminating method in which the other base material is melt-extruded onto a film or a sheet formed by using the EVOH composition pellets of the present disclosure; a laminating method in which the EVOH composition pellets of the present disclosure or the like are melt-extruded onto the other base material; a method in which the EVOH composition pellets of the present disclosure and the other base material are coextruded; and a method in which a film or a sheet (layer) formed by using the EVOH composition pellets of the present disclosure and the other base material (layer) are dry-laminated together with the use of a known adhesive agent such as of organic titanium compound, isocyanate compound, polyester compound or polyurethane compound. The melt forming temperature for the melt extrusion is generally selected from a range of 150° C. to 300° C.

The thermoplastic resin is useful as the other base material. Specific examples of the thermoplastic resin include: olefin homopolymers and copolymers including polyethylenes such as linear low-density polyethylenes, low-density polyethylenes, very-low-density polyethylenes, medium-density polyethylenes, and high-density polyethylenes, ethylene-vinyl acetate copolymers, ionomers, ethylene-propylene (block or random) copolymers, ethylene-acrylic acid copolymers, ethylene-acrylate copolymers, polypropylenes, propylene-α-olefin (C4 to C20 α-olefin) copolymers, polybutenes, and polypentenes, and polyolefin resins in a broader sense such as obtained by graft-modifying any of these olefin homopolymers and copolymers with an unsaturated carboxylic acid or an unsaturated carboxylic acid ester; and polyester resins, polyamide resins (including polyamide copolymers), polyvinyl chlorides, polyvinylidene chlorides, acryl resins, polystyrene resins, vinyl ester resins, polyester elastomers, polyurethane elastomers, chlorinated polyethylenes, chlorinated polypropylenes, aromatic and aliphatic polyketones, polyalcohols obtained by reduction of these polymers, and EVOHs other than the EVOH to be used in the present disclosure. From the viewpoint of the practicality and the physical properties (particularly, the strength) of the multilayer structure, the polypropylenes, the ethylene-propylene (block or random) copolymers, the polyamide resins, the polyethylenes, the ethylene-vinyl acetate copolymers, the polystyrene resins, polyethylene terephthalates (PET), and polyethylene naphthalates (PEN) are preferably used.

Where a product, such as a film or a sheet, formed by using the EVOH composition pellets of the present disclosure is extrusion-coated with the other base material, or where the film or the sheet formed by using the EVOH composition pellets of the present disclosure and a film, a sheet or the like of the other base material are laminated together with the use of the adhesive agent, usable examples of the base material other than the thermoplastic resins described above include paper, metal foil, uniaxially or biaxially stretched plastic film or sheet, film or sheet on which an inorganic compound is vapor-deposited, woven fabric, nonwoven fabric, metal fiber material, and wood material.

Where layers a (a1, a2, . . . ) formed by using the EVOH composition pellets of the present disclosure and layers b (b1, b2, . . . ) of the other base material (e.g., the thermoplastic resin) are laminated together to produce a multilayer structure having an innermost layer a, the layered configuration of the multilayer structure is not limited to a double layer structure a/b (which means an inner layer/outer layer structure, and this definition also applies to the following description), but may be any combination of these layers, e.g., a/b/a, a1/a2/b, a/b1/b2, a1/b1/a2/b2, a1/b1/b2/a2/b2/b1, or the like. Where the multilayer structure further includes a regrind layer R formed of a mixture containing at least the EVOH composition of the EVOH composition pellets of the present disclosure and the thermoplastic resin, the layered configuration of the multilayer structure may be, for example, a/R/b, a/R/a/b, a/b/R/a/R/b, a/b/a/R/a/b, a/b/R/a/R/a/R/b, or the like.

In the aforementioned layered configuration, as required, an adhesive resin layer may be provided between the layers. Various adhesive resins are usable as an adhesive resin for the adhesive resin layer. Examples of the adhesive resin for providing a highly stretchable multilayer structure include olefin polymers modified as containing a carboxyl group by chemically bonding an unsaturated carboxylic acid or its anhydride to the olefin polymers (the aforementioned polyolefin resins in a broader sense) by an addition reaction, a graft reaction or the like.

Specific preferred examples of the modified olefin polymers containing the hydroxyl group include polyethylenes graft-modified with maleic anhydride, polypropylenes graft-modified with maleic anhydride, ethylene-propylene (block or random) copolymers graft-modified with maleic anhydride, ethylene-ethyl acrylate copolymers graft-modified with maleic anhydride, and ethylene-vinyl acetate copolymers graft-modified with maleic anhydride, which may be used alone or in combination as a mixture. In this case, the proportion of the unsaturated carboxylic acid or its anhydride to be contained in the modified olefin polymers is preferably 0.001 to 3 wt. %, more preferably 0.01 to 1 wt. %, particularly preferably 0.03 to 0.5 wt. %. If the modification degree of such a modification product is excessively low, the adhesiveness tends to be poorer. If the modification degree is excessively high, on the other hand, a crosslinking reaction tends to occur, thereby reducing the formability.

Further, the adhesive resin may be blended with the EVOH of the EVOH composition pellets of the present disclosure, the other EVOH, a rubber/elastomer component such as polyisobutylene or ethylene propylene rubber, or the resin for the layer b. Particularly, the adhesiveness can be advantageously improved by blending a polyolefin resin different from the base polyolefin resin for the adhesive resin.

The thicknesses of the respective layers of the multilayer structure cannot be unconditionally specified, but depend upon the layered configuration, the type of the layer b, the use purpose, the shape of the formed product, and the required physical properties. The thickness of the layer a is typically selected from a range of 5 to 500 μm, preferably 10 to 200 μm, and the thickness of the layer b is typically selected from a range of 10 to 5,000 μm, preferably 30 to 1,000 μm. The thickness of the adhesive resin layer is typically selected from a range of 5 to 400 μm, preferably about 10 to about 150 μm.

The multilayer structure may be used as it is in various forms. It is preferred to perform a heat stretching process on the multilayer structure for improvement of the physical properties of the multilayer structure. The term "heat stretching process" herein means a process in which a thermally uniformly heated laminate in the form of a film, a sheet or a parison is uniformly formed into a cup, a tray, a tube or a film with the use of a chuck, a plug, a vacuum force, a compressed air force, blowing means, or other forming means. The stretching process may be a uniaxial stretching process or a biaxial stretching process. The stretching ratio of the laminate is preferably as high as possible for physical properties. This makes it possible to produce stretched formed products excellent in gas barrier property without pinholes, cracking, uneven stretching, uneven thickness, delamination (interlayer separation), and the like which may otherwise occur during the stretching.

Other exemplary methods for stretching the multilayer structure include roll stretching method, tenter stretching method, tubular stretching method, stretch-blowing method, and vacuum pressure forming method each having a higher stretching ratio. A simultaneous biaxial stretching method or a sequential biaxial stretching method may be employed for the biaxial stretching process. The stretching temperature is selected from a range of 60° C. to 170° C., preferably about 80° C. to about 160° C. It is also preferred to perform a heat-setting process after the completion of the stretching process. The heat-setting process may be performed by known means. The heat-setting may be achieved by heat-treating the stretched film at 80° C. to 170° C., preferably 100° C. to 160° C., for about 2 to about 600 seconds while keeping the stretched film in tension.

Where the multilayer structure is used for heat-shrink packaging applications for raw meat, processed meat, cheese or the like, the multilayer structure not subjected to the heat-setting process after the stretching is used as a product film, and the raw meat, the processed meat, the cheese or the like is wrapped with the film, which is in turn heat-treated at 50° C. to 130° C., preferably 70° C. to 120° C., for about 2 to about 300 seconds to be thereby heat-shrunk for tight packaging.

The multilayer structure thus produced may be used in any desired form. Exemplary forms include film, sheet, tape, and profile extrusion product. As required, the multilayer structure may be subjected to heat treatment, cooling process, rolling process, printing process, dry laminating process, solution or melt coating process, bag making process, deep drawing process, box making process, tube making process, splitting process, or the like.

Bags, cups, trays, tubes, bottles, and other containers, and caps produced from the film, the sheet or the stretched film formed in the aforementioned manner are excellent in appearance substantially without coloration, fisheyes, and the like and, therefore, are useful as packaging materials which need to satisfy stricter requirements for the gas barrier properties and the appearance. More specifically, these packaging material containers are useful for general foods, condiments such as mayonnaise and dressing, fermented foods such as miso, fat and oil such as salad oil, beverages, cosmetics, and pharmaceutical products.

EXAMPLES

Embodiments of the present disclosure will hereinafter be described more specifically by way of examples thereof. However, it should be understood that the embodiments of the present disclosure be not limited to these examples within the scope of the present disclosure.

In the following examples, the unit "parts" is based on weight.

First, measurement/evaluation methods for pellets used in Examples and Comparative Examples will be described.

<Measurement/Evaluation Methods>

(1) Overall Conjugated Polyene (Sorbic Acid) Content of Pellets

Where a conjugated polyene was directly added to surfaces of EVOH pellets, the amount of the added conjugated polyene was regarded as the conjugated polyene content of the EVOH composition pellets. Where the conjugated polyene was present within the EVOH pellets, the conjugated polyene content was determined by the following measurement method.

The EVOH composition pellets were freeze-pulverized, and 8 mL of an extraction solvent having a distilled water/methanol volume ratio of 1/1 was added to 1 g of the resulting EVOH composition powder. The resulting solution was ultrasonically treated still at a temperature of 20° C. for 1 hour, whereby sorbic acid was extracted from the EVOH composition. The resulting solution was cooled, and then diluted with the extraction solvent to a volume of 10 mL. The resulting solution was filtered with a filter having a pore size of 0.45 μm, and then analyzed by a liquid chromatography/UV spectrophotometer, whereby the amount of sorbic acid contained in the extraction solution was determined.
[HPLC Measurement Conditions]
LC system: Agilent 1260/1290 (available from Agilent Technologies, Inc.)
Detector: Agilent 1260 infinity diode array detector (available from Agilent Technologies, Inc.)
Column: Cadenza CD-C18 (100×3.0 mm, 3 μm) (available from Imtakt Corporation
Column Temperature: 40° C.
Mobile phase A: Aqueous solution containing 0.05% formic acid and 5% acetonitrile
Mobile phase B: Aqueous solution containing 0.05% formic acid and 95% acetonitrile
Time program: 0.0 to 5.0 minutes B (%)=30%
　　5.0 to 8.0 minutes B (%)=30% to 50%
　　8.0 to 10.0 minutes B (%)=50%
　　10.0 to 13.0 minutes B (%)=50% to 30%
　　13.0 to 15.0 minutes B (%)=30%
Flow rate: 0.2 mL/minute
UV detection wavelength: 190 to 400 nm
Quantitative wavelength: 262 nm
　　In the HPLC measurement conditions, "%" means vol. %.
　(2) Conjugated Polyene (Sorbic Acid) Content of Pellet Surface Portions First, 20 g of the EVOH composition pellets were immersed in 30 mL of an extraction solvent (having a distilled water/methanol volume ratio of 1/1) for 10 minutes with stirring for extraction of the conjugated polyene. Then, the resulting extraction liquid was concentrated to 2 mL, and filtered with a filter having a pore size of 0.45 μm. The resulting filtrate was used as a sample liquid, which was analyzed by liquid chromatography to determine the amount of the conjugated polyene contained in the filtrate. The amount of the conjugated polyene thus determined was divided by the weight (20 g) of the EVOH composition pellets, whereby the conjugated polyene content of the pellet surface portions was determined. The liquid chromatography was performed under the same conditions as for the determination of the overall conjugated polyene content of the pellets.

(3) Lubricant Content of Pellets

Where the lubricant was added to be contained only in the surfaces of the EVOH composition pellets, the amount of the added lubricant was regarded as the lubricant content.

(4) Boron Compound Content of Pellets

Where the boron compound was added to the surfaces of the EVOH composition pellets, the amount of the boron compound added to the EVOH composition pellet surfaces was regarded as the boron compound content. Where the boron compound was contained within the EVOH composition pellets, the boron compound content was determined by the following method.

First, 0.1 g of the EVOH composition pellets were treated together with concentrated nitric acid by a microwave decomposition method, and the resulting solution was diluted with purified water to a predetermined volume (0.75 mg/mL) to prepare a sample liquid. The boron content was determined by analyzing the sample liquid by means of an inductively coupled plasma emission spectrometer (ICP-AES) (720-ES Model available from Agilent Technologies, Inc.) The boron content thus determined corresponds to a boron amount attributable to the boron compound.

(5) Alkali Metal Content of Pellets

Where the alkali metal compound was directly added to the surfaces of the EVOH composition pellets, the alkali metal amount of the added alkali metal compound was regarded as the alkali metal content of the EVOH composition pellets. Where the alkali metal was contained within the EVOH composition pellets, the alkali metal content was determined by the following method.

First, 2 g of the EVOH composition pellets were put on a platinum dish. Then, several milliliters of sulfuric acid was added to the dish, and the EVOH composition pellets were heated by a gas burner. After it was confirmed that the pellets were carbonized and sulfuric acid fume was no longer observed, several droplets of sulfuric acid were added to the dish, and the EVOH composition pellets were further heated. This process was repeated until organic compounds were burned out for complete ashing. After the ashing, the dish was allowed to stand for cooling, and the resulting ash was dissolved in 1 mL of hydrochloric acid. The resulting hydrochloric acid solution was thoroughly washed and diluted with highly purified water to a volume of 50 mL. The alkali metal content of the resulting sample solution was determined by means of an inductively coupled plasma emission spectrometer (ICP-AES) (720-ES Model available from Agilent Technologies, Inc.) Finally, the alkali metal concentration of the solution was converted into the alkali metal content of the EVOH composition pellets.

(6) Water Content (Wt. %) of Pellets

A volatile content was determined based on the weights of the EVOH composition pellets before and after drying at a temperature of 150° C. for 5 hours. The volatile content was regarded as the water content of the EVOH composition pellets. More specifically, the water content was calculated from the following expression:

$$\text{Water content (wt. \%)}=[(Wb-Wa)/(Wb)]\times 100$$

In the above formula, Wb is the weight of EVOH composition pellets before drying, and Wa is the weight of EVOH composition pellets after drying.

(7) Fisheyes

A single-layer film having a thickness of 30 μm was formed under the following film forming conditions by using the EVOH composition pellets.

The number of fisheyes present in the 30-μm thick single-layer film was measured by means of a digital defect inspecting apparatus (GX-70LT available from Mamiya-OP Co., Ltd.)

The number of the fisheyes was determined by applying light from a lower side of the single-layer film and counting the number of light non-transmissive parts (having a diameter of 0.1 to 0.2 mm) per 100 $cm^2$ (10 cm×10 cm) of the film. For the measurement, the reading speed was 3 m/minute.

[Film Forming Conditions]
Extruder: Having a diameter (D) of 40 mm and L/D of 28
Screw: Full flight type having a compression ratio of 2.5
Screen pack: 60/90/60 mesh
Die: Coat hanger type having a width of 450 mm
Temperature setting:
C1/C2/C3/C4/A/D=180/200/220/220/210/210° C.
Screw rotation speed: 40 rpm
Roll temperature: 80° C.

<<(A) Examples Using Lubricant as Fisheye-Suppressing Component>>

Example 1

After 500 parts of vinyl acetate, 100 parts of methanol, 0.0585 parts of acetyl peroxide, and 0.015 parts of citric acid were fed into a polymerization can provided with a cooling coil, the internal atmosphere of the polymerization can was once replaced with nitrogen gas and then with ethylene. Ethylene was further fed into the polymerization can to an ethylene pressure of 40 kg/cm$^2$. Then, the internal temperature of the polymerization can was increased to 67° C. under ethylene pressure with stirring, whereby the polymerization was started. When the polymerization degree reached 60% after a lapse of 6 hours from the start of the polymerization, 0.0525 parts of sorbic acid was added as a polymerization inhibitor to the polymerization can. Thus, an ethylene-vinyl acetate copolymer having an ethylene structural unit content of 32.5 mol % was prepared. Then, the resulting reaction liquid containing the ethylene-vinyl acetate copolymer was fed into a distillation column, and methanol vapor was introduced into the column from a lower portion of the column to remove unreacted vinyl acetate, whereby a methanol solution of the ethylene-vinyl acetate copolymer was prepared. Subsequently, a methanol solution containing sodium hydroxide in an amount of 0.007 equivalents per equivalent of acetic acid group remaining in the copolymer was added to the methanol solution of the ethylene-vinyl acetate copolymer, whereby the ethylene-vinyl acetate copolymer was saponified. Thus, a methanol solution of EVOH (containing 30 wt. % of EVOH and 70 wt. % of methanol) was prepared. The EVOH had a saponification degree of 99.7 mol %.

Water vapor was blown into the resulting EVOH methanol solution, and the resulting methanol vapor was removed to the outside of the system. Thus, a mixed solution having an EVOH content of 40 wt. % and a water/methanol weight ratio of 40/60 was prepared. The water/methanol mixed solution of the EVOH was extruded into strands in cooling water. The strands (hydrous porous strands) were cut by a cutter, whereby porous pellets (EVOH pellets) each having a diameter of 3.8 mm, a length of 4 mm, and an EVOH content of 35 wt. % were produced.

Then, the porous pellets were rinsed with 300 parts of a rinsing treatment liquid containing 0.1 part of sodium acetate, 0.1 part of acetic acid, 0.003 parts of boric acid (on a boron basis), and 0.0008 parts of sorbic acid (having a sorbic acid concentration of 2.7 ppm) based on 100 parts of the porous pellets for 1 hour. This rinsing treatment was performed five times. Then, the resulting porous pellets were dried at 110° C. for 8 hours in a nitrogen stream having an oxygen concentration of not higher than 0.5 vol. %. Thus, EVOH pellets having a water content of 0.15 wt. %, a sodium content of 0.06 wt. %, and a boric acid content of 0.015 wt. % (on a boron basis) based on the weight of the EVOH were produced. The pellets had an MFR of 3.8 g/10 minutes (as measured at 210° C. with a load of 2160 g). The EVOH pellets (conjugated polyene-containing EVOH pellets) thus produced had an overall conjugated polyene content of 150 ppm and a surface conjugated polyene content of 39 ppb as measured by the aforementioned evaluation methods.

Subsequently, the conjugated polyene-containing EVOH pellets were dry-blended with a lubricant (ethylene bis-stearamide ALFLOW H-50T available from NOF corporation) so as to have a lubricant content of 110 ppm on a weight basis. Thus, EVOH composition pellets were produced.

The EVOH composition pellets thus produced were evaluated by counting the number of fisheyes by the aforementioned method. The results are shown below in Table 1.

Example 2

After 621 parts of vinyl acetate, 100 parts of methanol, 0.0745 parts of acetyl peroxide (based on the weight of vinyl acetate), and 0.012 parts of citric acid (based on the weight of vinyl acetate) were fed into a polymerization can provided with a cooling coil, the internal atmosphere of the polymerization can was once replaced with nitrogen gas and then with ethylene. Ethylene was further fed into the polymerization can to an ethylene pressure of 40 kg/cm$^2$. Then, the internal temperature of the polymerization can was increased to 67° C. under ethylene pressure with stirring, whereby the polymerization was started. When the polymerization degree reached 38% after a lapse of 3.5 hours from the start of the polymerization, 0.2136 parts of sorbic acid was added as a polymerization inhibitor to the polymerization can. Thus, an ethylene-vinyl acetate copolymer having an ethylene structural unit content of 32.0 mol % was prepared. Then, the resulting reaction liquid containing the ethylene-vinyl acetate copolymer was fed into a distillation column, and methanol vapor was introduced into the column from a lower portion of the column to remove unreacted vinyl acetate, whereby a methanol solution of the ethylene-vinyl acetate copolymer was prepared. Subsequently, a methanol solution containing sodium hydroxide in an amount of 0.010 equivalent per equivalent of acetic acid group remaining in the copolymer was added to the methanol solution of the ethylene-vinyl acetate copolymer, whereby the ethylene-vinyl acetate copolymer was saponified. Thus, a methanol solution of EVOH (containing 37.6 wt. % of EVOH and 42.4 wt. % of methanol) was prepared. The EVOH had a saponification degree of 99.7 mol %.

Water vapor was blown into the resulting EVOH methanol solution, and the resulting methanol vapor was removed to the outside of the system. Thus, a mixed solution having an EVOH content of 42 wt. % and a water/methanol weight ratio of 40/60 was prepared. The water/methanol mixed solution of the EVOH was extruded into strands in cooling water. The strands (hydrous porous strands) were cut by a cutter, whereby porous pellets (EVOH pellets) each having a diameter of 3.5 mm, a length of 3.7 mm, and an EVOH content of 35 wt. % were produced.

Then, the porous pellets were rinsed with 300 parts of a rinsing treatment liquid containing 0.1 part of sodium acetate, 0.1 part of acetic acid, 0.003 parts of boric acid (on a boron basis), and 0.0008 parts of sorbic acid (having a sorbic acid concentration of 2.7 ppm) based on 100 parts of the porous pellets for 2.5 hours. Then, the resulting porous pellets were dried at 105° C. for 8 hours in a nitrogen stream having an oxygen concentration of not higher than 0.5 vol. %. Thus, EVOH pellets having a water content of 0.15 wt. %, a sodium content of 0.06 wt. %, and a boric acid content of 0.015 wt. % (on a boron basis) based on the weight of the EVOH were produced. The pellets had an MFR of 3.8 g/10 minutes (as measured at 210° C. with a load of 2160 g).

The EVOH pellets (conjugated polyene-containing EVOH pellets) thus produced had an overall conjugated polyene content of 280 ppm and a surface conjugated polyene content of 280 ppb as measured by the aforementioned evaluation methods.

Subsequently, the conjugated polyene-containing EVOH pellets were dry-blended with a lubricant (ethylene bis-stearamide ALFLOW H-50T available from NOF corporation) so as to have a lubricant content of 300 ppm on a weight basis. Thus, EVOH composition pellets were produced.

The pellets thus produced were evaluated by counting the number of fisheyes in the same manner as in Example 1. The results are shown below in Table 1.

Comparative Examples 1 and 2

EVOH composition pellets were produced in substantially the same manner as in Example 1, except that the lubricant content was adjusted as shown below in Table 1.

The pellets thus produced were evaluated by counting the number of fisheyes in the same manner as in Example 1. The results are shown below in Table 1.

Comparative Example 3

EVOH composition pellets were produced in substantially the same manner as in Example 1, except that the rinsing treatment liquid was prepared as containing 0.1 part of sodium acetate, 0.1 part of acetic acid, and 0.003 parts of boric acid (on a boron basis) based on 100 parts of the porous pellets so as to adjust the surface sorbic acid content and the overall sorbic acid content as shown below in Table 1.

The pellets thus produced were evaluated by counting the number of fisheyes in the same manner as in Example 1. The results are shown below in Table 1.

TABLE 1

| | Conjugated polyene (sorbic acid) | | | | |
|---|---|---|---|---|---|
| | Surface content (ppb) | Overall content (ppm) | Surface content/ Overall content | Lubricant content (ppm) | Fisheyes/ 100 cm |
| Example 1 | 39 | 150 | $2.6 \times 10^{-4}$ | 110 | 0 |
| Example 2 | 280 | 280 | $1 \times 10^{-3}$ | 300 | 0 |
| Comparative Example 1 | 39 | 150 | $2.6 \times 10^{-4}$ | 0 | 2 |
| Comparative Example 2 | 39 | 150 | $2.6 \times 10^{-4}$ | 500 | 1 |
| Comparative Example 3 | 21 | 150 | $1.4 \times 10^{-4}$ | 110 | 12 |

The above results indicate that, in Examples 1 and 2 in which the conjugated polyene content (i.e., sorbic acid content) of the surface portions of the EVOH composition pellets was not lower than 30 ppb based on the weight of the pellets and the lubricant content was 10 to 400 ppm based on the weight of the pellets, the occurrence of the fisheyes was suppressed.

In comparative Example 1 in which the sorbic acid content was the same as in Example 1 but the lubricant was not contained, the fisheye-suppressing effect was insufficient.

In Comparative Example 2 in which the sorbic acid content was the same as in Example 1 but the lubricant content was greater than the specific range, the fisheye-suppressing effect was insufficient. Where the lubricant content is excessively high, the EVOH composition pellets are liable to slip to be poorly bit by the screw of the extruder, resulting in stagnation thereof in the extruder. This is supposedly why the number of the fisheyes was conversely increased.

In Comparative Example 3 in which the overall sorbic acid content was the same as in Example 1 but the surface sorbic acid content was less than 30 ppb, the fisheye-suppressing effect was insufficient.

<<(B) Examples Using Boron Compound as Fisheye-Suppressing Component>>

Example 3

After 500 parts of vinyl acetate, 100 parts of methanol, 0.0585 parts of acetyl peroxide, and 0.015 parts of citric acid were fed into a polymerization can provided with a cooling coil, the internal atmosphere of the polymerization can was once replaced with nitrogen gas and then with ethylene. Ethylene was further fed into the polymerization can to an ethylene pressure of 40 kg/cm². Then, the internal temperature of the polymerization can was increased to 67° C. under ethylene pressure with stirring, whereby the polymerization was started. When the polymerization degree reached 60% after a lapse of 6 hours from the start of the polymerization, 0.0525 parts of sorbic acid was added as a polymerization inhibitor to the polymerization can. Thus, an ethylene-vinyl acetate copolymer having an ethylene structural unit content of 32.5 mol % was prepared. Then, the resulting reaction liquid containing the ethylene-vinyl acetate copolymer was fed into a distillation column, and methanol vapor was introduced into the column from a lower portion of the column to remove unreacted vinyl acetate, whereby a methanol solution of the ethylene-vinyl acetate copolymer was prepared. Subsequently, a methanol solution containing sodium hydroxide in an amount of 0.007 equivalents per equivalent of acetic acid group remaining in the copolymer was added to the methanol solution of the ethylene-vinyl acetate copolymer, whereby the ethylene-vinyl acetate copolymer was saponified. Thus, a methanol solution of EVOH (containing 30 wt. % of EVOH resin and 70 wt. % of methanol) was prepared. The EVOH had a saponification degree of 99.7 mol %.

Water vapor was blown into the resulting EVOH methanol solution, and the resulting methanol vapor was removed to the outside of the system. Thus, a mixed solution having an EVOH content of 40 wt. % and a water/methanol weight ratio of 40/60 was prepared. The water/methanol mixed solution of the EVOH was extruded into strands in cooling water. The strands (hydrous porous strands) were cut by a cutter, whereby porous pellets each having a diameter of 3.8 mm, a length of 4 mm, and an EVOH content of 35 wt. % were produced.

Then, the porous pellets were rinsed with 300 parts of a rinsing treatment liquid containing 0.1 part of sodium acetate, 0.1 part of acetic acid, 0.003 parts of boric acid (on a boron basis), and 0.0008 parts of sorbic acid (having a sorbic acid concentration of 2.7 ppm and a boron compound concentration of 1.8 ppm (on a boron basis)) based on 100 parts of the porous pellets for 1 hour. This rinsing treatment was performed five times. Then, the resulting porous pellets were dried at 110° C. for 8 hours in a nitrogen stream having an oxygen concentration of not higher than 0.5 vol. %. Thus, EVOH composition pellets having a water content of 0.15 wt %, a sodium content of 0.06 wt. %, and a boric acid content of 0.015 wt. % (on a boron basis) based on the weight of the EVOH composition were produced. The pellets had an MFR of 3.8 g/10 minutes (as measured at 210° C. with a load of 2160 g). The EVOH composition pellets (EVOH composition pellets containing the conjugated polyene and the boron compound) thus produced had an overall conjugated polyene content of 150 ppm, a surface conjugated polyene content of 39 ppb, and a boron compound content of 170 ppm (on a boron basis) as measured by the aforementioned evaluation methods.

The pellets thus produced were evaluated by counting the number of fisheyes in the same manner as in Example 1. The results are shown below in Table 2.

Example 4

After 575 parts of vinyl acetate, 100 parts of methanol, 0.0621 parts of acetyl peroxide (based on the weight of vinyl acetate), and 0.012 parts of citric acid (based on the weight of vinyl acetate) were fed into a polymerization can provided with a cooling coil, the internal atmosphere of the polymerization can was once replaced with nitrogen gas and then with ethylene. Ethylene was further fed into the polymerization can to an ethylene pressure of 40 kg/cm². Then, the internal temperature of the polymerization can was increased to 67° C. under ethylene pressure with stirring, whereby the polymerization was started. When the polymerization degree reached 38% after a lapse of 3.5 hours from the start of the polymerization, 0.1978 parts of sorbic acid was added as a polymerization inhibitor to the polymerization can. Thus, an ethylene-vinyl acetate copolymer having an ethylene structural unit content of 32.0 mol % was prepared. Then, the resulting reaction liquid containing the ethylene-vinyl acetate copolymer was fed into a distillation column, and methanol vapor was introduced into the column from a lower portion of the column to remove unreacted vinyl acetate, whereby a methanol solution of the ethylene-vinyl acetate copolymer was prepared. Subsequently, a methanol solution containing sodium hydroxide in an amount of 0.010 equivalent per equivalent of acetic acid group remaining in the copolymer was added to the methanol solution of the ethylene-vinyl acetate copolymer, whereby the ethylene-vinyl acetate copolymer was saponified. Thus, a methanol solution of EVOH (containing 37.6 wt. % of EVOH and 42.4 wt. % of methanol) was prepared. The EVOH had a saponification degree of 99.7 mol %.

Water vapor was blown into the resulting EVOH methanol solution, and the resulting methanol vapor was removed to the outside of the system. Thus, a mixed solution having an EVOH content of 42 wt. % and a water/methanol weight ratio of 40/60 was prepared. The water/methanol mixed solution of the EVOH was extruded into strands in cooling water. The strands (hydrous porous strands) were cut by a cutter, whereby porous pellets (EVOH pellets) each having a diameter of 3.5 mm, a length of 3.7 mm, and an EVOH content of 35 wt. % were produced.

Then, the porous pellets were rinsed with 300 parts of a rinsing treatment liquid containing 0.1 part of sodium acetate, 0.1 part of acetic acid, 0.003 parts of boric acid (on a boron basis), and 0.0008 parts of sorbic acid (having a sorbic acid concentration of 2.7 ppm) based on 100 parts of the porous pellets for 2.5 hours. Then, the resulting porous pellets were dried at 105° C. for 8 hours in a nitrogen stream having an oxygen concentration of not higher than 0.5 vol. %. Thus, EVOH composition pellets having a water content of 0.15 wt. %, a sodium content of 0.06 wt. %, and a boric acid content of 0.015 wt. % (on a boron basis) based on the weight of the EVOH composition were produced. The pellets had an MFR of 12.0 g/10 minutes (as measured at 210° C. with a load of 2160 g).

The EVOH composition pellets (EVOH composition pellets containing the conjugated polyene and the boron compound) thus produced had an overall conjugated polyene content of 260 ppm, a surface conjugated polyene content of 250 ppb, and a boron compound content of 20 ppm (on a boron basis) as measured by the aforementioned evaluation methods.

The pellets thus produced were evaluated by counting the number of fisheyes in the same manner as in Example 1. The results are shown below in Table 2.

Example 5

After 962 parts of vinyl acetate, 100 parts of methanol, 0.1106 parts of acetyl peroxide, and 0.016 parts of citric acid were fed into a polymerization can provided with a cooling coil, the internal atmosphere of the polymerization can was once replaced with nitrogen gas and then with ethylene. Ethylene was further fed into the polymerization can to an ethylene pressure of 43.8 kg/cm². Then, the internal temperature of the polymerization can was increased to 67° C. under ethylene pressure with stirring, whereby the polymerization was started. When the polymerization degree reached 38% after a lapse of 3.5 hours from the start of the polymerization, 0.2886 parts of sorbic acid was added as a polymerization inhibitor to the polymerization can. Thus, an ethylene-vinyl acetate copolymer having an ethylene structural unit content of 34.0 mol % was prepared. Then, the resulting reaction liquid containing the ethylene-vinyl acetate copolymer was fed into a distillation column, and methanol vapor was introduced into the column from a lower portion of the column to remove unreacted vinyl acetate, whereby a methanol solution of the ethylene-vinyl acetate copolymer was prepared. Subsequently, a methanol solution containing sodium hydroxide in an amount of 0.010 equivalent per equivalent of acetic acid group remaining in the copolymer was added to the methanol solution of the ethylene-vinyl acetate copolymer, whereby the ethylene-vinyl acetate copolymer was saponified. Thus, a methanol solution of EVOH (containing 37.6 wt. % of EVOH and 72.4 wt. % of methanol) was prepared. The EVOH had a saponification degree of 99.7 mol %.

Water vapor was blown into the resulting EVOH methanol solution, and the resulting methanol vapor was removed to the outside of the system. Thus, a mixed solution having an EVOH content of 42 wt. % and a water/methanol weight ratio of 40/60 was prepared. The water/methanol mixed solution of the EVOH was extruded into strands in cooling water. The strands (hydrous porous strands) were cut by a cutter, whereby porous. pellets each having a diameter of 3.5 mm, a length of 3.7 mm, and an EVOH content of 35 wt. % were produced.

Then, the porous pellets were rinsed with 300 parts of a rinsing treatment liquid containing 0.1 part of sodium acetate, 0.1 part of acetic acid, 0.003 parts of boric acid (on a boron basis), and 0.0008 parts of sorbic acid (having a sorbic acid concentration of 2.7 ppm) based on 100 parts of the porous pellets for 2.5 hours. Then, the resulting porous pellets were dried at 105° C. for 8 hours in a nitrogen stream having an oxygen concentration of not higher than 0.5 vol. %. Thus, EVOH composition pellets having a water content of 0.15 wt. %, a sodium content of 0.06 wt. %, and a boric acid content of 0.015 wt. % (on a boron basis) based on the weight of the EVOH composition were produced. The pellets had an MFR of 3.8 g/10 minutes (as measured at 210° C. with a load of 2160 g).

The EVOH composition pellets (EVOH composition pellets containing the conjugated polyene and the boron compound) thus produced had an overall conjugated polyene content of 340 ppm, a surface conjugated polyene content of 350 ppb, and a boron compound content of 170 ppm (on a boron basis) as measured by the aforementioned evaluation methods.

The pellets thus produced were evaluated by counting the number of fisheyes in the same manner as in Example 1. The results are shown below in Table 2.

Example 6

EVOH composition pellets were produced in substantially the same manner as in Example 3, except that the overall conjugated polyene content, the surface conjugated polyene content, and the boron compound content were adjusted as shown below in Table 2. The EVOH composition pellets (EVOH composition pellets containing the conjugated polyene and the boron compound) had an overall conjugated polyene content of 60 ppm, a surface conjugated polyene content of 280 ppb, and a boron compound content of 170 ppm (on a boron basis) as measured by the above evaluation methods.

The pellets thus produced were evaluated by counting the number of fisheyes in the same manner as in Example 1. The results are shown below in Table 2.

Comparative Example 4

EVOH composition pellets were produced in substantially the same manner as in Example 3, except that the rinsing treatment liquid was prepared as containing 0.1 part of sodium acetate, 0.1 part of acetic acid, and 0.0008 parts of sorbic acid based on 100 parts of the porous pellets.

A single-layer film was formed by using the pellets thus produced, and evaluated by counting the number of fisheyes in the same manner as in Example 1. The results are shown below in Table 2.

Comparative Example 5

EVOH composition pellets were produced as containing the conjugated polyene and having a boron compound content of 500 ppm on a boron basis by treating the EVOH composition pellets prepared in Example 3.

A single-layer film was formed by using the pellets thus produced, and evaluated by counting the number of fisheyes in the same manner as in Example 1. The results are shown below in Table 2.

Comparative Example 6

EVOH composition pellets were produced in substantially the same manner as in Example 3, except that the rinsing treatment liquid was prepared as containing 0.1 part of sodium acetate, 0.1 part of acetic acid, and 0.003 parts of boric acid (on a boron basis) based on 100 parts of the porous pellets to adjust the surface conjugated polyene content as shown below in Table 2.

The pellets thus produced were evaluated by counting the number of fisheyes in the same manner as in Example 1. The results are shown below in Table 2.

TABLE 2

| | Conjugated polyene (sorbic acid) | | | Boron | |
| --- | --- | --- | --- | --- | --- |
| | Surface content (ppb) | Overall content (ppm) | Surface content/ Overall content | compound content (ppm) (on boron basis) | Fisheyes/ 100 cm |
| Example 3 | 39 | 150 | $2.6 \times 10^{-4}$ | 170 | 0 |
| Example 4 | 250 | 260 | $9.6 \times 10^{-4}$ | 20 | 0 |
| Example 5 | 350 | 340 | $10.3 \times 10^{-4}$ | 170 | 0 |
| Example 6 | 280 | 60 | $46.7 \times 10^{-4}$ | 170 | 0 |
| Comparative Example 4 | 39 | 150 | $2.6 \times 10^{-4}$ | 0 | 3 |
| Comparative Example 5 | 39 | 150 | $2.6 \times 10^{-4}$ | 500 | >15,000 |
| Comparative Example 6 | 21 | 150 | $1.4 \times 10^{-4}$ | 170 | 12 |

The above results indicate that, in Examples 3 to 6 in which the conjugated polyene content (i.e., the sorbic acid content) of the surface portions of the EVOH composition pellets was not lower than 30 ppb based on the weight of the pellets and the boron compound content was 10 to 250 ppm based on the weight of the pellets, the occurrence of the fisheyes was suppressed.

In comparative Example 4 in which the surface sorbic acid content and the overall sorbic acid content were the same as in Example 3 but the boron compound was not contained and in Comparative Example 5 in which the boron compound content was greater than the specific range, the fisheye-suppressing effect was insufficient.

In Comparative Example 6 in which the overall sorbic acid content was the same as in Example 3 but the surface sorbic acid content was less than 30 ppb, the EVOH composition pellets were insufficient in fisheye-suppressing effect.

<<(C) Examples Using Alkali Metal as Fisheye-Suppressing Component>>

Example 7

After 500 parts of vinyl acetate, 100 parts of methanol, 0.0585 parts of acetyl peroxide, and 0.015 parts of citric acid were fed into a polymerization can provided with a cooling coil, the internal atmosphere of the polymerization can was once replaced with nitrogen gas and then with ethylene. Ethylene was further fed into the polymerization can to an ethylene pressure of 40 kg/cm$^2$. Then, the internal temperature of the polymerization can was increased to 67° C. under ethylene pressure with stirring, whereby the polymerization was started. When the polymerization degree reached 60% after a lapse of 6 hours from the start of the polymerization, 0.0525 parts of sorbic acid was added to the polymerization can. Thus, an ethylene-vinyl acetate copolymer having an ethylene structural unit content of 32.5 mol % was prepared. Then, the resulting reaction liquid containing the ethylene-vinyl acetate copolymer was fed into a distillation column, and methanol vapor was introduced into the column from a lower portion of the column to remove unreacted vinyl acetate, whereby a methanol solution of the ethylene-vinyl acetate copolymer was prepared. Subsequently, a methanol solution containing sodium hydroxide in an amount of 0.007 equivalents per equivalent of acetic acid group remaining in the copolymer was fed into the methanol solution of the ethylene-vinyl acetate copolymer, whereby the ethylene-vinyl acetate copolymer was saponified. Thus, a methanol solution of EVOH (containing 30 wt. % of EVOH and 70 wt. % of methanol) was prepared. The EVOH had a saponification degree of 99.7 mol %.

Water vapor was blown into the resulting EVOH methanol solution, and the resulting methanol vapor was removed to the outside of the system. Thus, a mixed solution having an EVOH content of 40 wt. % and a water/methanol weight ratio of 40/60 was prepared. The water/methanol mixed solution of the EVOH was extruded into strands in cooling water. The strands (hydrous porous strands) were cut by a cutter, whereby porous pellets each having a diameter of 3.8 mm, a length of 4 mm, and an EVOH content of 35 wt. % were produced.

Then, the porous pellets were rinsed with 300 parts of a rinsing treatment liquid containing 0.1 part of sodium acetate, 0.1 part of acetic acid, 0.003 parts of boric acid (on a boron basis), and 0.0008 parts of sorbic acid (having a sorbic acid concentration of 2.7 ppm and an alkali metal concentration of 89 ppm) based on 100 parts of the porous pellets for 1 hour. This rinsing treatment was performed five times. Then, the resulting porous pellets were dried at 110° C. for 8 hours in a nitrogen stream having an oxygen concentration of not higher than 0.5 vol. %. Thus, EVOH composition pellets having a water content of 0.15 wt. %, a sodium content of 0.02 wt. %, and a boric acid content of 0.015 wt. % (on a boron basis) based on the weight of the EVOH were produced. The EVOH composition pellets (EVOH composition pellets containing the conjugated polyene and the alkali metal) thus produced had an overall conjugated polyene content of 150 ppm, a surface conjugated polyene content of 39 ppb, and an alkali metal content of 200 ppm as measured by the aforementioned evaluation methods.

Then, a single-layer film was formed by using the pellets thus produced, and evaluated by counting the number of fisheyes in the same manner as in Example 1. The results are shown below in Table 3.

Example 8

EVOH composition pellets were produced in substantially the same manner as in Example 7, except that the overall conjugated polyene content, the surface conjugated polyene content, and the alkali metal content were adjusted as shown below in Table 3. The EVOH composition pellets (EVOH composition pellets containing the conjugated polyene and the alkali metal) had an overall conjugated polyene content of 60 ppm, a surface conjugated polyene content of 280 ppb, and an alkali metal content of 140 ppm as measured by the above evaluation methods.

A single-layer film was formed by using the pellets thus produced, and evaluated by counting the number of fisheyes in the same manner as in Example 1. The results are shown below in Table 3.

Comparative Example 7

EVOH composition pellets were produced as containing the conjugated polyene and having an alkali metal content of 700 ppm by treating the EVOH pellets prepared in Example 7.

The pellets thus produced were evaluated by counting the number of fisheyes in the same manner as in Example 1. The results are shown below in Table 3.

Comparative Example 8

EVOH composition pellets were produced in substantially the same manner as in Example 7, except that the rinsing treatment liquid had a formulation containing 0.1 part of sodium acetate, 0.1 part of acetic acid, and 0.003 parts of boric acid (on a boron basis) based on 100 parts of the porous pellets so as to adjust the surface sorbic acid content and the overall sorbic acid content as shown below in Table 3.

The pellets thus produced were evaluated by counting the number of fisheyes in the same manner as in Example 1. The results are shown below in Table 3.

TABLE 3

| | Conjugated polyene (sorbic acid) | | | | |
|---|---|---|---|---|---|
| | Surface content (ppb) | Overall content (ppm) | Surface content/ Overall content | Alkali metal content (ppm) | Fisheyes/ 100 cm |
| Example 7 | 39 | 150 | $2.6 \times 10^{-4}$ | 200 | 1 |
| Example 8 | 280 | 60 | $46.7 \times 10^{-4}$ | 140 | 0 |
| Comparative Example 7 | 39 | 150 | $2.6 \times 10^{-4}$ | 700 | 107 |
| Comparative Example 8 | 21 | 150 | $1.4 \times 10^{-4}$ | 200 | 12 |

The above results indicate that, in Examples 7 and 8 in which the conjugated polyene content (i.e., the sorbic acid content) of the surface portions of the EVOH composition pellets was not lower than 30 ppb based on the weight of the pellets and the alkali metal content was 1 to 500 ppm based on the weight of the pellets, the occurrence of the fisheyes was suppressed.

In comparative Example 7 in which the surface sorbic acid content and the overall sorbic acid content were the same as in Example 7 but the alkali metal content was greater than the specific range, the fisheye-suppressing effect was insufficient. In Comparative Example 8 in which the overall sorbic acid content and the alkali metal content were the same as in Example 7 but the surface sorbic acid content was less than 30 ppb, the fisheye-suppressing effect was insufficient.

While specific forms of the embodiments of the present disclosure have been shown in the aforementioned examples, the examples are merely illustrative of the disclosure but not limitative of the disclosure. It is contemplated that various modifications apparent to those skilled in the art could be made within the scope of the disclosure.

The EVOH composition pellets of the present disclosure can prevent the occurrence of the fisheyes and, therefore, can be advantageously used as a packaging material which needs to satisfy stricter requirements for film appearance. In the production method of the present disclosure, the EVOH composition pellets of the present disclosure can be produced with the use of an existing production facility simply by changing the formulation of the pellet rinsing liquid.

The invention claimed is:

1. Ethylene-vinyl alcohol copolymer composition pellets comprising:
   an ethylene-vinyl alcohol copolymer;
   a conjugated polyene; and
   at least one component selected from the group consisting of:
   (A) 10 to 400 ppm of a lubricant based on a weight of the ethylene-vinyl alcohol copolymer composition pellets;
   (B) 10 to 250 ppm of a boron compound based on the weight of the ethylene-vinyl alcohol copolymer composition pellets; and
   (C) 1 to 500 ppm of an alkali metal based on the weight of the ethylene-vinyl alcohol copolymer composition pellets;
   wherein pellet surface portions of the ethylene-vinyl alcohol copolymer composition pellets have a conjugated polyene content of not lower than 30 ppb based on the weight of the ethylene-vinyl alcohol copolymer composition pellets; and
   wherein a weight-based content ratio (surface conjugated polyene content/overall conjugated polyene content) between the conjugated polyene content of the pellet surface portions of the ethylene-vinyl alcohol copolymer composition pellets and the overall conjugated polyene content of the ethylene-vinyl alcohol copolymer composition pellets is not lower than $1.5\times10^{-4}$.

2. The ethylene-vinyl alcohol copolymer composition pellets according to claim 1, wherein the conjugated polyene content of the pellet surface portions is determined by dissolving 20 g of the ethylene-vinyl alcohol copolymer composition pellets in 30 mL of a mixed solvent having a water/methanol volume ratio of 1/1 with stirring for 10 minutes, and dividing the conjugated polyene amount contained in a resulting solution by the weight of the ethylene-vinyl alcohol copolymer composition pellets.

3. The ethylene-vinyl alcohol copolymer composition pellets according to claim 1, which have an overall conjugated polyene content of 0.1 to 10,000 ppm based on the weight of the pellets.

4. The ethylene-vinyl alcohol copolymer composition pellets according to claim 1,
wherein the conjugated polyene is at least one selected from the group consisting of sorbic acid, a sorbic acid ester, and a sorbic acid salt.

5. A method for producing the ethylene-vinyl alcohol copolymer composition pellets according to claim 1, comprising:

bringing pellets of an ethylene-vinyl alcohol copolymer into contact with a treatment liquid containing a conjugated polyene; and bringing the ethylene-vinyl alcohol copolymer pellets into contact with at least one component selected from the group consisting of a lubricant, a boron compound, and an alkali metal.

6. The ethylene-vinyl alcohol copolymer composition pellet production method according to claim 5, wherein the ethylene-vinyl alcohol copolymer pellets are prepared by solidifying and pelletizing an alcohol solution or a water/alcohol mixed solution of the ethylene-vinyl alcohol copolymer.

7. The ethylene-vinyl alcohol copolymer composition pellet production method according to claim 5, wherein the ethylene-vinyl alcohol copolymer pellets are porous ethylene-vinyl alcohol copolymer pellets.

8. The ethylene-vinyl alcohol copolymer composition pellet production method according to claim 5,
further comprising adding the conjugated polyene as a polymerization inhibitor to an ethylene-vinyl ester copolymer and then saponifying the ethylene-vinyl ester copolymer to prepare the ethylene-vinyl alcohol copolymer.

* * * * *